United States Patent
Jung

(10) Patent No.: US 11,529,739 B2
(45) Date of Patent: Dec. 20, 2022

(54) ROBOT AND OPERATION METHOD THEREFOR

(71) Applicant: LG ELECTRONICS INC., Seoul (KR)

(72) Inventor: Jaesik Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 931 days.

(21) Appl. No.: 16/339,193

(22) PCT Filed: Aug. 29, 2017

(86) PCT No.: PCT/KR2017/009432
§ 371 (c)(1),
(2) Date: Apr. 3, 2019

(87) PCT Pub. No.: WO2018/066816
PCT Pub. Date: Apr. 12, 2018

(65) Prior Publication Data
US 2019/0240839 A1   Aug. 8, 2019

(30) Foreign Application Priority Data

Oct. 7, 2016  (KR) .................. 10-2016-0130067

(51) Int. Cl.
*G01C 21/34* (2006.01)
*B25J 9/16* (2006.01)
(Continued)

(52) U.S. Cl.
CPC ............... *B25J 9/1694* (2013.01); *B25J 9/16* (2013.01); *B25J 11/00* (2013.01); *B25J 13/06* (2013.01);
(Continued)

(58) Field of Classification Search
CPC ...... B25J 9/0003; B25J 9/1664; B25J 9/1679; B25J 9/1694; B25J 13/06; G01C 21/206;
(Continued)

(56) References Cited

U.S. PATENT DOCUMENTS 7,536,545 B2 * 5/2009 Nozaki .................. G06Q 30/02
                                                713/161
2003/0195702 A1 * 10/2003 Koga ............... G08G 1/096883
                                                340/995.27
(Continued)

FOREIGN PATENT DOCUMENTS

JP      2008-152504     7/2008
KR   10-2007-0045630    5/2007
(Continued)

OTHER PUBLICATIONS

International Search Report (with English Translation) and Written Opinion dated Nov. 29, 2017 issued in Application No. PCT/KR2017/009432.

*Primary Examiner* — Dalena Tran
(74) *Attorney, Agent, or Firm* — Ked & Associates, LLP

(57) ABSTRACT

The present invention is the invention for providing a guidance service by using a robot. For example, the robot may provide the guidance service in an airport. The robot may receive a destination, acquire a movement path from a current position to the destination, and transmit the movement path to the mobile terminal. The mobile terminal may receive the movement path from the robot and display a guidance path representing a movement path and a user path representing a position movement of the mobile terminal and overlapping the guidance path.

12 Claims, 23 Drawing Sheets

(51) Int. Cl.
*H04W 4/029* (2018.01)
*B25J 13/06* (2006.01)
*H04W 4/80* (2018.01)
*B25J 11/00* (2006.01)
*H04M 1/725* (2021.01)
*H04M 1/02* (2006.01)

(52) U.S. Cl.
CPC ............. *H04M 1/02* (2013.01); *H04M 1/725* (2013.01); *H04W 4/029* (2018.02); *H04W 4/80* (2018.02); *G05B 2219/50391* (2013.01)

(58) Field of Classification Search
CPC .... G06K 9/00805; H04W 4/029; H04W 4/80; H04N 7/18
USPC ............. 700/253; 340/995.19; 701/400, 517, 701/533, 532; 455/41.2, 456.1, 457, 455/456.2, 456.3; 348/116
See application file for complete search history.

(56) References Cited

U.S. PATENT DOCUMENTS

| 2007/0067104 A1* | 3/2007 | Mays ................. G01C 21/3647 701/437 |
| 2008/0147261 A1 | 6/2008 | Ichinose et al. |
| 2011/0153201 A1* | 6/2011 | Park ..................... G01C 21/206 701/533 |
| 2017/0285635 A1* | 10/2017 | Sisbot ................ G01C 21/3407 |

FOREIGN PATENT DOCUMENTS

| KR | 10-2008-0090150 | 10/2008 |
| KR | 10-2010-0006975 | 1/2010 |
| KR | 10-2011-0009339 | 1/2011 |

* cited by examiner

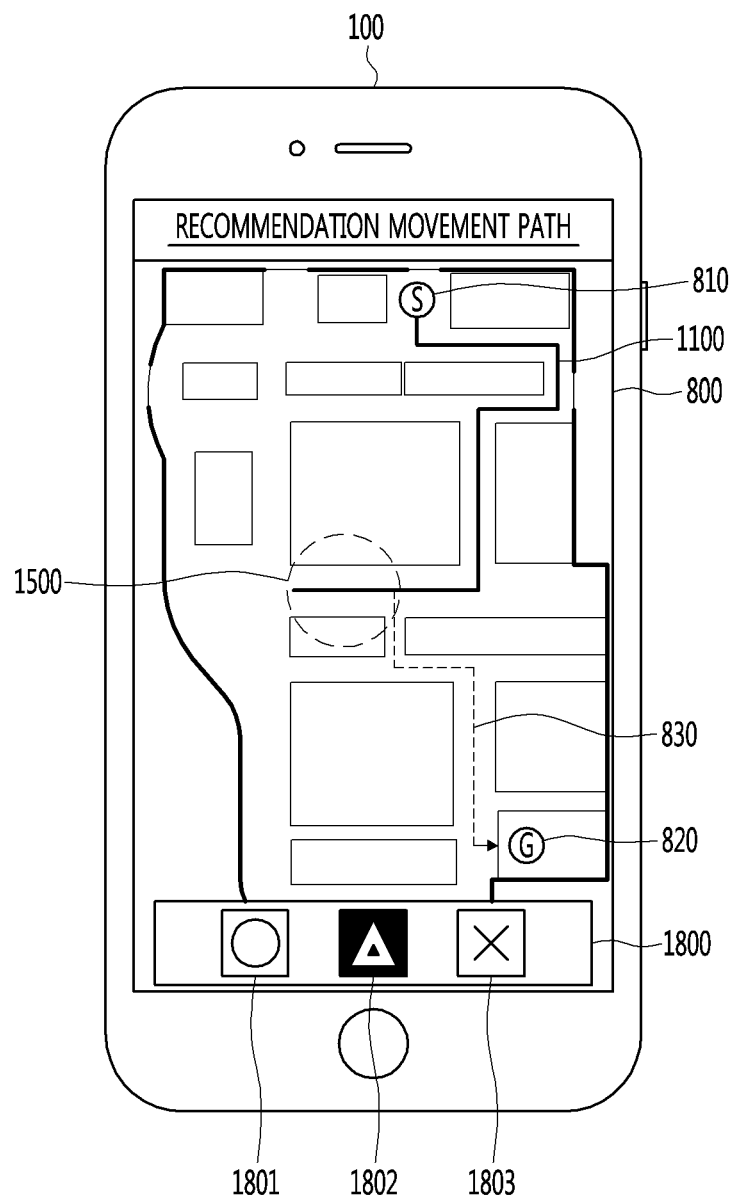

ROBOT AND OPERATION METHOD THEREFOR

CROSS-REFERENCE TO RELATED PATENT APPLICATIONS

This application is a U.S. National Stage Application under 35 U.S.C. § 371 of PCT Application No. PCT/KR2017/009432, filed Aug. 29, 2017, which claims priority to Korean Patent Application No. 10-2016-0130067, filed Oct. 7, 2016, whose entire disclosures are hereby incorporated by reference.

TECHNICAL FIELD

The present invention relates to a robot disposed at airport and an operating method thereof, and more particularly, to an airport robot and an operating method thereof, which simultaneously display a guidance path and a real-time movement path in a case of providing a road guidance service.

BACKGROUND ART

Recently, as deep learning technology, self-driving technology, automatic control technology, and Internet of things (IoT) advance, it is possible to implement intelligent robots. Intelligent robots are disposed at public places such as airport, and thus, it is possible to provide users with various information and services.

Each technology will be described below in detail. Deep learning corresponds to the field of machine learning. The deep learning is technology which allows a program to perform similar determination on various situations, instead of a method where a condition and a command are previously set in a program. Therefore, according to the deep learning, computers may think similar to brains of humans and may analyze massive data.

Self-driving is technology where a machine determines and moves autonomously to avoid an obstacle. According to the self-driving technology, a robot autonomously recognizes and moves a position through a sensor to avoid an obstacle.

The automatic control technology denotes technology where a machine feeds back a measurement value, obtained by inspecting a machine state, to a control device to automatically control an operation of the machine. Therefore, control may be performed without manipulation by a user, and control may be automatically performed so that a desired control target reaches a desired range.

IoT denotes intelligent technology and service where all things are connected to one another over Internet and information exchanges between a user and a thing and between a thing and a thing. Devices connected to Internet through IoT transmit or receive information to perform autonomous communication, without the help of a user.

There is a global positioning system (GPS) for calculating a current position of a user. The GPS performs an arithmetic operation on a distance between a GPS satellite and a GPS receiver to calculate coordinates. In order to determine a current position, three or more GPS satellites are needed. Also, when radio waves are received from three or more GPS satellites, a relatively accurate position may be checked.

DISCLOSURE

Technical Problem

A first problem of the present invention is directed to providing a method which displays in real time a position movement of a user, for preventing a case of deviating from a guidance path provided from an airport robot.

A second problem of the present invention is directed to providing an airport robot which transmits a GPS signal to a mobile terminal of a user, for accurately recognizing a position of the user in airport.

A third problem of the present invention is directed to providing an airport robot which, when a user moves to a path differing from a guidance path, recommends another path so as to provide a convenient road guidance service.

Technical Solution

An airport robot system according to an embodiment of the present invention for solving the first problem of the present invention is configured with an airport robot and a mobile terminal. The airport robot may transmit a guidance path to the mobile terminal. The mobile terminal may simultaneously display a guidance path received from the airport robot and a user path representing a position movement of the mobile terminal.

An airport robot system according to an embodiment of the present invention for solving the second problem of the present invention may transmit a GPS signal to a mobile terminal. The mobile terminal may recognize a current position by using a GPS signal received from each of a plurality of airport robots.

According to an embodiment of the present invention for solving the third problem of the present invention, a mobile terminal may determine a position at which a guidance path differs from a user path. The airport robot may acquire a movement path from a position, at which the guidance path differs from the user path, to the mobile terminal.

Advantageous Effects

According to various embodiments of the present invention, a mobile terminal which has received a movement path from an airport robot may simultaneously display a guidance path and a user path. Therefore, there is an effect where the user may quickly check whether to move identically to the guidance path or move unlike the guidance path.

According to various embodiments of the present invention, when a GPS signal is received from a GPS satellite, a problem difficult to recognize an accurate position at an indoor place may be solved. That is, there is an effect where a current position at airport may be accurately recognized by receiving the GPS signal from an airport robot. Accordingly, there is an effect which may accurately display a user path.

According to various embodiments of the present invention, whether a user is normally moving along a guidance path may be checked, and simultaneously, when the user moves along an abnormal path, another path may be provided. Accordingly, there is an effect where the user may conveniently move to a destination.

DESCRIPTION OF DRAWINGS

FIGS. 14A to 14D are diagrams for describing a method of displaying a movement path and a guidance path according to a fourth embodiment of the present invention.

MODE FOR INVENTION

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

Figure 1:
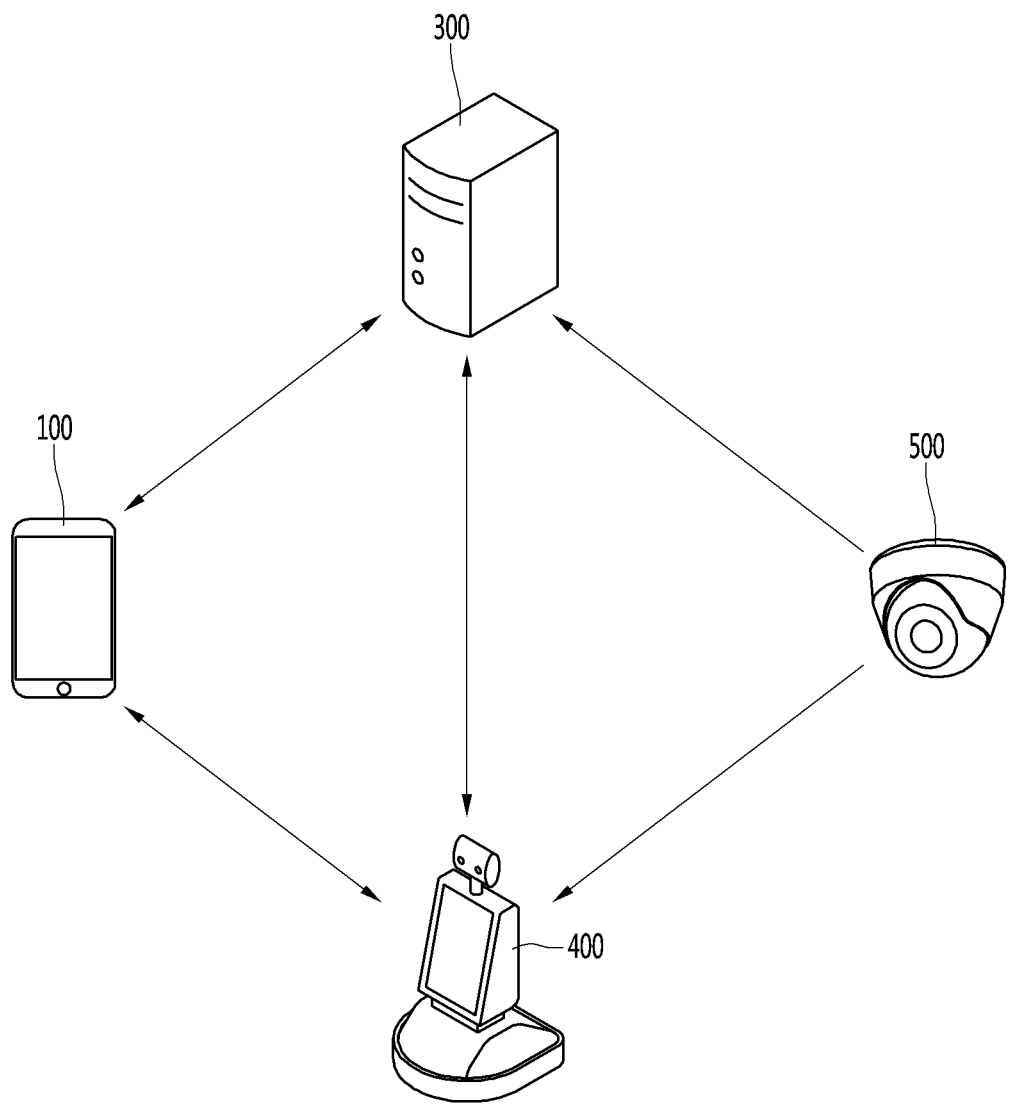
FIG. 1 is a diagram illustrating the structure of an airport robot system according to an embodiment of the present invention.

FIG. 1 is a diagram illustrating the structure of an airport robot system according to an embodiment of the present invention.

The airport robot system according to the embodiment of the present invention may include a mobile terminal 100, a server 300, an airport robot (or robot) 400 and a camera 500.

The mobile terminal 100 may transmit and receive data to and from the server 300 in the airport. For example, the mobile terminal 100 may receive airport related data such as a flight time schedule, an airport map, etc. from the server 300. A user may receive necessary information of the airport from the server 300 through the mobile terminal 100. In addition, the mobile terminal 100 may transmit data such as a photo, a moving image, a message, etc. to the server 300. For example, the user may transmit the photograph of a missing child to the server 300 to report the missing child or photograph an area of the airport where cleaning is required through the camera 121 to request cleaning of the area.

In addition, the mobile terminal 100 may transmit and receive data to and from the airport robot 400.

For example, the mobile terminal 100 may transmit, to the airport robot 400, a signal for calling the airport robot 400, a signal for instructing that specific operation is performed, or an information request signal. The airport robot 400 may move to the position of the mobile terminal 100 or perform operation corresponding to the instruction signal in response to the call signal received from the mobile terminal 100. Alternatively, the airport robot 400 may transmit data corresponding to the information request signal to the mobile terminal 100 of the user.

Next, the airport robot 400 may perform patrol, guidance, cleaning, disinfection and transportation within the airport.

The airport robot 400 may transmit and receive signals to and from the mobile terminal 100 or the server 300. For example, the airport robot 400 may transmit and receive signals including information on the situation of the airport to and from the server 300. In addition, the airport robot 400 may receive image information of the areas of the airport from the camera 500 in the airport. Accordingly, the airport robot 400 may monitor the situation of the airport through the image information captured by the airport robot 400 and the image information received from the camera 500.

The airport robot 400 may directly receive a command from the user. For example, a command may be directly received from the user through input of touching the display unit provided in the airport robot 400 or voice input. The airport robot 400 may perform patrol, guidance, cleaning, etc. according to the command received from the user, the mobile terminal 100 or the server 300.

Next, the server 300 may receive information from the mobile terminal 100, the airport robot 400 and the camera 500. The server 300 may collect, store and manage the information received from the devices. The server 300 may transmit the stored information to the mobile terminal 100 or the airport robot 400. In addition, the server 300 may transmit command signals to a plurality of the airport robots 400 disposed in the airport.

The camera 500 may include a camera installed in the airport. For example, the camera 500 may include a plurality of closed circuit television (CCTV) cameras installed in the airport, an infrared thermal-sensing camera, etc. The camera 500 may transmit the captured image to the server 300 or the airport robot 400.

Figure 2:
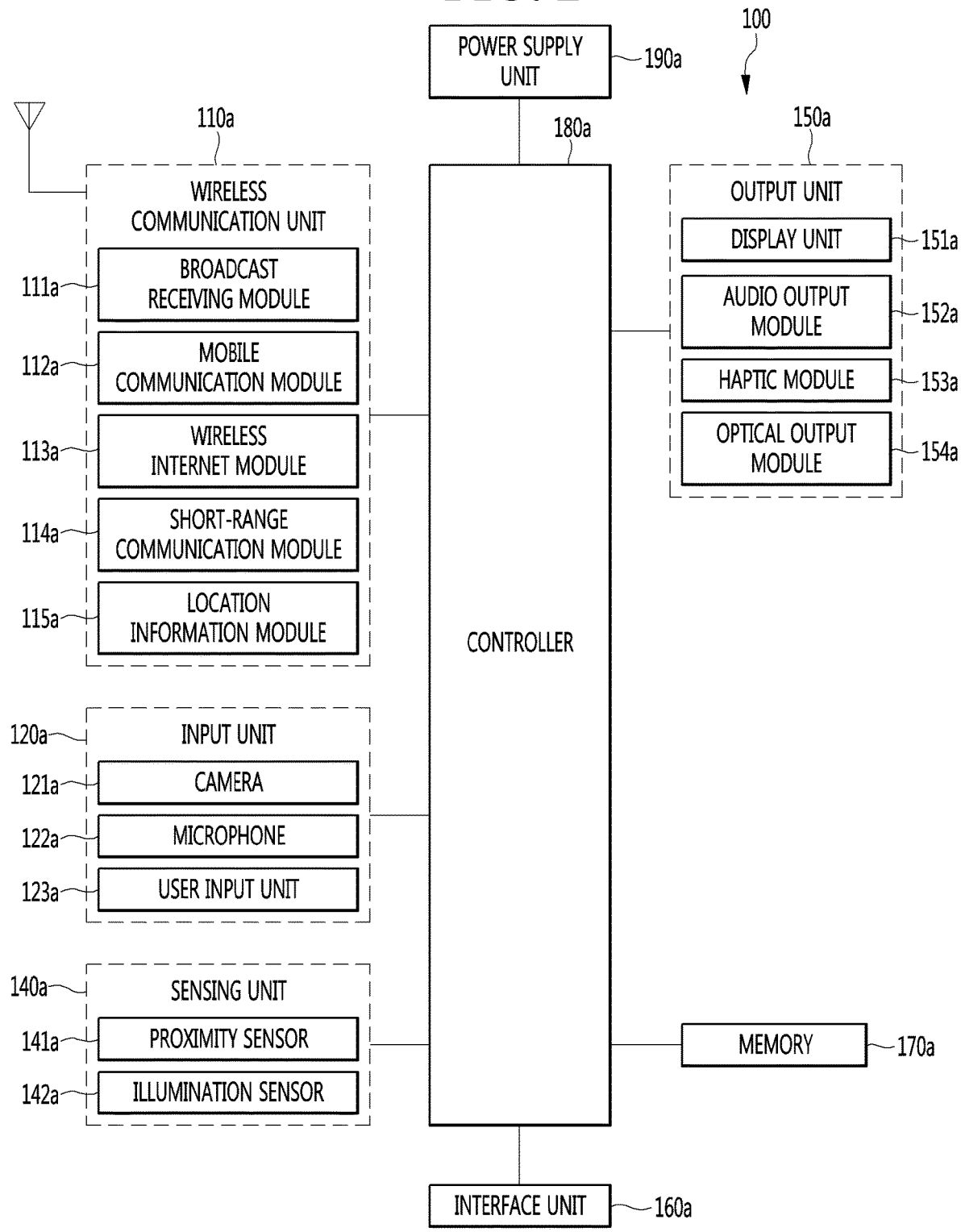
FIG. 2 is a block diagram of a mobile terminal in accordance with the present disclosure.

FIG. 2 is a block diagram of a mobile terminal in accordance with the present disclosure.

The mobile terminal 100 is shown having components such as a wireless communication unit (or a wireless communication interface) 110a, an input unit 120a, a sensing unit 140a, an output unit 150a, an interface unit 160a, a memory 170a, a controller 180a, and a power supply unit 190a. It is understood that implementing all of the illustrated components is not a requirement, and that greater or fewer components may alternatively be implemented.

The wireless communication unit 110a typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110a typically includes one or more modules which connect the mobile terminal 100 to one or more networks.

To facilitate such communications, the wireless communication unit 110a includes one or more of a broadcast receiving module 111a, a mobile communication module 112a, a wireless Internet module 113a, a short-range communication module 114a, and a location information module 115a.

The input unit 120a includes a camera 121a for obtaining images or video, a microphone 122a, which is one type of audio input device for inputting an audio signal, and a user input unit 123a (for example, a touch key, a push key, a mechanical key, a soft key, and the like) for allowing a user to input information. Data (for example, audio, video, image, and the like) is obtained by the input unit 120a and may be analyzed and processed by controller 180a according to device parameters, user commands, and combinations thereof.

The sensing unit 140a is typically implemented using one or more sensors configured to sense internal information of the mobile terminal, the surrounding environment of the mobile terminal, user information, and the like. For example, in FIG. 2, the sensing unit 140a is shown having a proximity sensor 141a and an illumination sensor 142a. If desired, the sensing unit 140a may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121a), a microphone 122a, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140a, and in particular, information obtained from one or more sensors of the sensing unit 140a, and combinations thereof.

The output unit 150a is typically configured to output various types of information, such as audio, video, tactile output, and the like. The output unit 150a is shown having a display unit (or display) 151a, an audio output module 152a, a haptic module 153a, and an optical output module 154a. The display unit 151a may have an inter-layered structure or an integrated structure with a touch sensor in order to facilitate a touch screen. The touch screen may provide an output interface between the mobile terminal 100 and a user, as well as function as the user input unit 123a which provides an input interface between the mobile terminal 100 and the user.

The interface unit 160a serves as an interface with various types of external devices that can be coupled to the mobile terminal 100. The interface unit 160a, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160a.

The memory 170a is typically implemented to store data to support various functions or features of the mobile terminal 100. For instance, the memory 170a may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170a, installed in the mobile terminal 100, and executed by the controller 180a to perform an operation (or function) for the mobile terminal 100.

The controller 180a typically functions to control overall operation of the mobile terminal 100, in addition to the operations associated with the application programs. The controller 180a may provide or process information or functions appropriate for a user by processing signals, data, information and the like, which are input or output by the various components depicted in FIG. 2, or activating application programs stored in the memory 170a.

As one example, the controller 180a controls some or all of the components illustrated in FIG. 2 according to the execution of an application program that have been stored in the memory 170a.

The power supply unit 190a can be configured to receive external power or provide internal power in order to supply appropriate power required for operating elements and components included in the mobile terminal 100. The power supply unit 190a may include a battery, and the battery may be configured to be embedded in the terminal body, or configured to be detachable from the terminal body.

At least some of the elements may operate in cooperation with one another for implementing an operation, control, or a control method of a mobile terminal according to various embodiments described below. Also, the operation, control, or control method of the mobile terminal may be implemented in a mobile terminal by driving at least one application program stored in the memory 170a.

Referring still to FIG. 2, various components depicted in this figure will now be described in more detail.

Regarding the wireless communication unit 110a, the broadcast receiving module 111a is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111a may be utilized to facilitate simultaneously receiving of two or more broadcast channels, or to support switching among broadcast channels.

The mobile communication module 112a can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112a include audio call signals, video (telephony) call signals, or various formats of data to support communication of text and multimedia messages.

The wireless Internet module 113a is configured to facilitate wireless Internet access. This module may be internally or externally coupled to the mobile terminal 100. The wireless Internet module 113*a* may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113*a* may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113*a* performs such wireless Internet access. As such, the Internet module 113*a* may cooperate with, or function as, the mobile communication module 112*a*.

The short-range communication module 114*a* is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114*a* in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114*a* may sense or recognize the wearable device, and permit communication between the wearable device and the mobile terminal 100. In addition, when the sensed wearable device is a device which is authenticated to communicate with the mobile terminal 100, the controller 180*a*, for example, may cause transmission of data processed in the mobile terminal 100 to the wearable device via the short-range communication module 114*a*. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115*a* is generally configured to detect, calculate, derive or otherwise identify a position of the mobile terminal. As an example, the location information module 115*a* includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115*a* may alternatively or additionally function with any of the other modules of the wireless communication unit 110*a* to obtain data related to the position of the mobile terminal.

The input unit 120*a* may be configured to permit various types of input to the mobile terminal 120*a*. Examples of such input include audio, image, video, data, and user input. Image and video input is often obtained using one or more cameras 121*a*. Such cameras 121*a* may process image frames of still pictures or video obtained by image sensors in a video or image capture mode. The processed image frames can be displayed on the display unit 151*a* or stored in memory 170*a*. In some cases, the cameras 121*a* may be arranged in a matrix configuration to permit a plurality of images having various angles or focal points to be input to the mobile terminal 100. As another example, the cameras 121*a* may be located in a stereoscopic arrangement to acquire left and right images for implementing a stereoscopic image.

The microphone 122*a* is generally implemented to permit audio input to the mobile terminal 100. The audio input can be processed in various manners according to a function being executed in the mobile terminal 100. If desired, the microphone 122*a* may include assorted noise removing algorithms to remove unwanted noise generated in the course of receiving the external audio.

The user input unit 123*a* is a component that permits input by a user. Such user input may enable the controller 180*a* to control operation of the mobile terminal 100. The user input unit 123*a* may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140*a* is generally configured to sense one or more of internal information of the mobile terminal, surrounding environment information of the mobile terminal, user information, or the like. The controller 180*a* generally cooperates with the sending unit 140*a* to control operation of the mobile terminal 100 or execute data processing, a function or an operation associated with an application program installed in the mobile terminal based on the sensing provided by the sensing unit 140*a*. The sensing unit 140*a* may be implemented using any of a variety of sensors, some of which will now be described in more detail.

The proximity sensor 141*a* may include a sensor to sense presence or absence of an object approaching a surface, or an object located near a surface, by using an electromagnetic field, infrared rays, or the like without a mechanical contact. The proximity sensor 141*a* may be arranged at an inner region of the mobile terminal covered by the touch screen, or near the touch screen.

The proximity sensor 141a, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141a can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141a may sense proximity touch, and proximity touch patterns (for example, distance, direction, speed, time, position, moving status, and the like). In general, controller 180a processes data corresponding to proximity touches and proximity touch patterns sensed by the proximity sensor 141a, and cause output of visual information on the touch screen. In addition, the controller 180a can control the mobile terminal 100 to execute different operations or process different data according to whether a touch with respect to a point on the touch screen is either a proximity touch or a contact touch.

A touch sensor can sense a touch applied to the touch screen, such as display unit 151a, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151a, or convert capacitance occurring at a specific part of the display unit 151a, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180a. Accordingly, the controller 180a may sense which region of the display unit 151a has been touched. Here, the touch controller may be a component separate from the controller 180a, the controller 180a, and combinations thereof.

In some embodiments, the controller 180a may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180a, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121a typically includes at least one a camera sensor (CCD, CMOS etc.), a photo sensor (or image sensors), and a laser sensor.

Implementing the camera 121a with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151a is generally configured to output information processed in the mobile terminal 100. For example, the display unit 151a may display execution screen information of an application program executing at the mobile terminal 100 or user interface (UI) and graphic user interface (GUI) information in response to the execution screen information.

In some embodiments, the display unit 151a may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152a is generally configured to output audio data. Such audio data may be obtained from any of a number of different sources, such that the audio data may be received from the wireless communication unit 110a or may have been stored in the memory 170a. The audio data may be output during modes such as a signal reception mode, a call mode, a record mode, a voice recognition mode, a broadcast reception mode, and the like. The audio output module 152a can provide audible output related to a particular function (e.g., a call signal reception sound, a message reception sound, etc.) performed by the mobile terminal 100. The audio output module 152a may also be implemented as a receiver, a speaker, a buzzer, or the like.

A haptic module 153a can be configured to generate various tactile effects that a user feels, perceive, or otherwise experience. A typical example of a tactile effect generated by the haptic module 153a is vibration. The strength, pattern and the like of the vibration generated by the haptic module 153a can be controlled by user selection or setting by the controller. For example, the haptic module 153a may output different vibrations in a combining manner or a sequential manner.

Besides vibration, the haptic module 153a can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153a can also be implemented to allow the user to feel a tactile effect through a muscle sensation such as the user's fingers or arm, as well as transferring the tactile effect through direct contact. Two or more haptic modules 153a may be provided according to the particular configuration of the mobile terminal 100.

An optical output module 154a can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154a may be implemented in such a manner that the mobile terminal emits monochromatic light or light with a plurality of colors. The signal output may be terminated as the mobile terminal senses that a user has checked the generated event, for example.

The interface unit 160a serves as an interface for external devices to be connected with the mobile terminal 100. For example, the interface unit 160a can receive data transmitted from an external device, receive power to transfer to elements and components within the mobile terminal 100, or transmit internal data of the mobile terminal 100 to such external device. The interface unit 160a may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160a.

When the mobile terminal 100 is connected with an external cradle, the interface unit 160a can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170a can store programs to support operations of the controller 180a and store input/output data (for example, phonebook, messages, still images, videos, etc.). The memory 170a may store data related to various patterns of vibrations and audio which are output in response to touch inputs on the touch screen.

The memory 170a may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170a over a network, such as the Internet.

The controller 180a may typically control the general operations of the mobile terminal 100. For example, the controller 180a may set or release a lock state for restricting a user from inputting a control command with respect to applications when a status of the mobile terminal meets a preset condition.

The controller 180a can also perform the controlling and processing associated with voice calls, data communications, video calls, and the like, or perform pattern recognition processing to recognize a handwriting input or a picture drawing input performed on the touch screen as characters or images, respectively. In addition, the controller 180a can control one or a combination of those components in order to implement various exemplary embodiments disclosed herein.

The power supply unit 190a receives external power or provide internal power and supply the appropriate power required for operating respective elements and components included in the mobile terminal 100. The power supply unit 190a may include a battery, which is typically rechargeable or be detachably coupled to the terminal body for charging.

The power supply unit 190a may include a connection port. The connection port may be configured as one example of the interface unit 160a to which an external charger for supplying power to recharge the battery is electrically connected.

As another example, the power supply unit 190a may be configured to recharge the battery in a wireless manner without use of the connection port. In this example, the power supply unit 190a can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111a of FIG. 2 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115a is generally configured to detect, calculate, or otherwise identify a position of the mobile terminal. As an example, the location information module 115a may include a Global Position System (GPS) module, a Wi-Fi module, or both. If desired, the location information module 115a may alternatively or additionally function with any of the other modules of the wireless communication unit 110a to obtain data related to the position of the mobile terminal.

A typical GPS module 115a can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Figure 3:
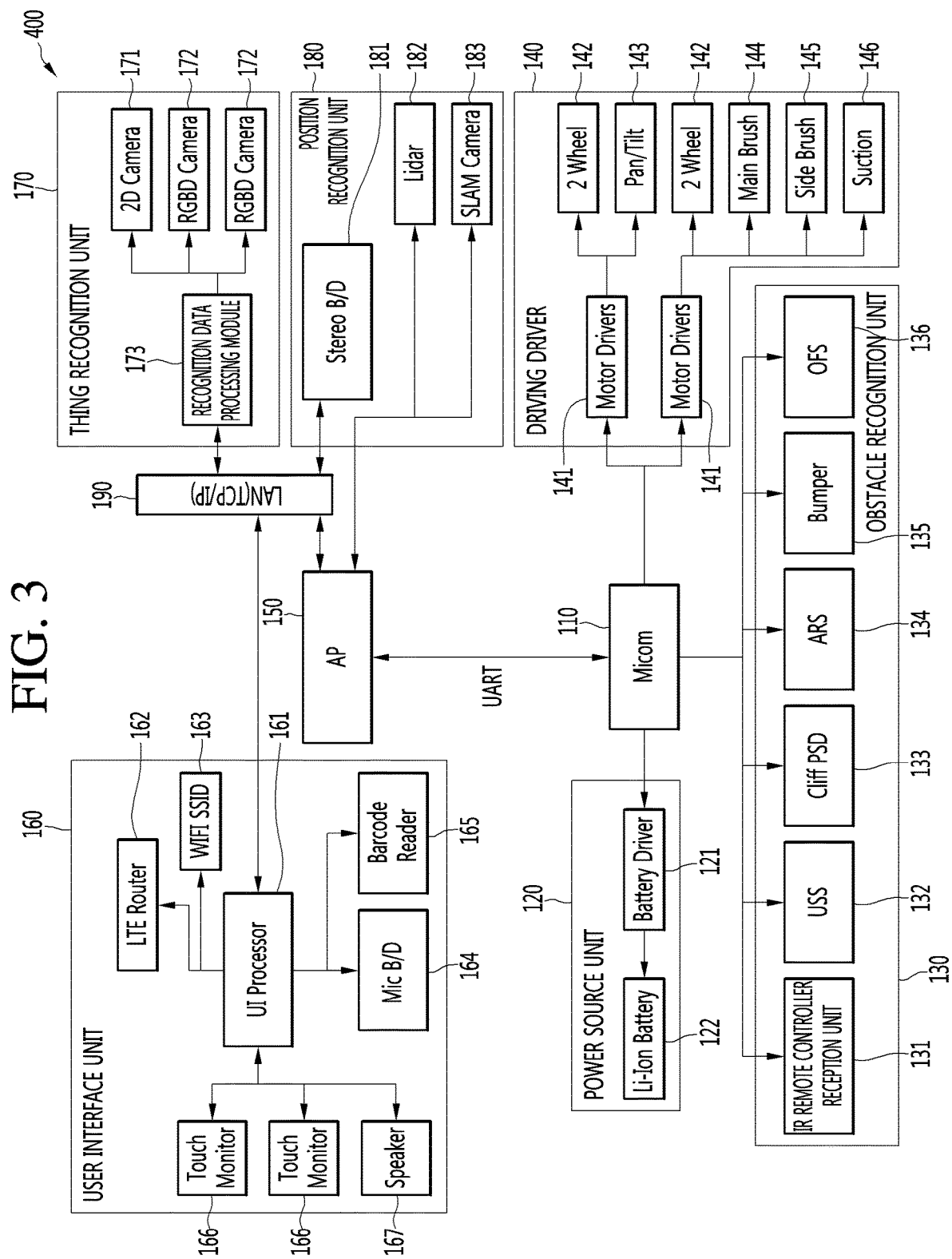
FIG. 3 is a block diagram illustrating a hardware configuration of an airport robot according to an embodiment of the present invention.

FIG. 3 is a block diagram illustrating a hardware configuration of an airport robot according to an embodiment of the present invention.

As illustrated in FIG. 3, hardware of the airport robot according to an embodiment of the present invention may be configured with a microcomputer group and an AP group. The microcomputer group may include a microcomputer 110, a power source unit 120, an obstacle recognition unit 130, and a driving driver 140. The AP group may include an AP 150, a user interface unit 160, a thing recognition unit 170, a position recognition unit 180, and a local area network (LAN) 190.

The microcomputer 110 may manage the power source unit 120 including a battery of the hardware of the airport robot, the obstacle recognition unit 130 including various kinds of sensors, and the driving driver 140 including a plurality of motors and wheels.

The power source unit 120 may include a battery driver 121 and a lithium-ion (li-ion) battery 122. The battery driver 121 may manage charging and discharging of the li-ion battery 122. The li-ion battery 122 may supply power for driving the airport robot. The li-ion battery 122 may be configured by connecting two 24V/102 A li-ion batteries in parallel.

The obstacle recognition unit 130 may include an infrared (IR) remote controller reception unit 131, an ultrasonic sensor (USS) 132, a cliff PSD 133, an attitude reference system (ARS) 134, a bumper 135, and an optical flow sensor (OFS) 136. The IR remote controller reception unit 131 may include a sensor which receives a signal from an IR remote controller for remotely controlling the airport robot. The USS 132 may include a sensor for determining a distance between an obstacle and the airport robot by using an ultrasonic signal. The cliff PSD 133 may include a sensor for sensing a precipice or a cliff within a forward-direction airport robot driving range of 360 degrees. The ARS 134 may include a sensor for detecting a gesture of the airport robot. The ARS 134 may include a sensor which is configured with an acceleration 3-axis and a gyro 3-axis for detecting the number of rotations. The bumper 135 may include a sensor which senses a collision between the airport robot and an obstacle. The sensor included in the bumper 135 may sense a collision between the airport robot and an obstacle within a 360-degree range. The OFS 136 may include a sensor for measuring a phenomenon where a wheel is spinning in driving of the airport robot and a driving distance of the airport robot on various floor surfaces.

The driving driver 140 may include a motor driver 141, a wheel motor 142, a rotation motor 143, a main brush motor 144, a side brush motor 145, and a suction motor 146. The motor driver 141 may perform a function of driving the wheel motor, the brush motor, and suction motor for driving and cleaning of the airport robot. The wheel motor 142 may drive a plurality of wheels for driving of the airport robot. The rotation motor 143 may be driven for a lateral rotation and a vertical rotation of a head unit of the airport robot or a main body of the airport robot, or may be driven the direction change or rotation of a wheel of the airport robot. The main brush motor 144 may drive a brush which sweeps filth on an airport floor. The side brush motor 145 may drive a brush which sweeps filth in a peripheral area of an outer surface of the airport robot. The suction motor 146 may be driven for sucking filth on the airport floor.

The AP 150 may function as a central processing unit which manages a whole hardware module system of the airport robot. The AP 150 may transmit, to the microcomputer 110, user input/output information and application program driving information for driving by using position information obtained through various sensors, thereby allowing a motor or the like to be performed.

The user interface unit 160 may include a user interface (UI) processor 161, a long term evolution (LTE) router (or wireless interface) 162, a WIFI SSID 163, a microphone board 164, a barcode reader 165, a touch monitor 166, and a speaker 167. The user interface processor 161 may control an operation of the user interface unit which performs an input/output of a user. The LTE router 162 may receive necessary information from the outside and may perform LTE communication for transmitting information to the user. The WIFI SSID 163 may analyze WIFI signal strength to perform position recognition on a specific object or the airport robot. The microphone board 164 may receive a plurality of microphone signals, process a sound signal into sound data which is a digital signal, and analyze a direction of the sound signal and a corresponding sound signal. The barcode reader 165 may read barcode information described in a plurality of targets used in airport. The touch monitor 166 may include a monitor for displaying output information and a touch panel which is configured for receiving the input of the user. The speaker 167 may inform the user of specific information through a voice.

The thing recognition unit 170 may include a two-dimensional (2D) camera 171, a red, green, blue, and distance (RGBD) camera 172, and a recognition data processing module 173. The 2D camera 171 may be a sensor for recognizing a person or an object on the basis of a 2D image. The RGBD camera 172 may be a camera including RGBD sensors or may be a sensor for detecting a person or an object by using captured images including depth data obtained from other similar three-dimensional (3D) imaging devices. The recognition data processing module 173 may process a signal such as 2D image/video or 3D image/video obtained from the 2D camera and the RGBD camera 172 to recognize a person or an object.

The position recognition unit 180 may include a stereo board (B/D) 181, a light detection and ranging (LIDAR) 182, and a simultaneous localization and mapping (SLAM) camera 183. The SLAM camera 183 may implement simultaneous position tracing and mapping technology. The airport robot may detect ambient environment information by suing the SLAM camera 183 and may process obtained information to generate a map corresponding to a duty performing space and simultaneously estimate its absolute position. The LIDAR 182, a laser radar, may be a sensor which irradiates a laser beam and collects and analyzes rearward-scattered light of light absorbed or scattered by aerosol to perform position recognition. The stereo board 181 may process sensing data collected from the LIDAR 182 and the SLAM camera 183 to manage data for recognizing a position of the airport robot and an obstacle.

The LAN 190 may perform communication with the user interface processor 161 associated with a user input/output, the recognition data processing module 173, the stereo board 181, and the AP 150.

Figure 4:
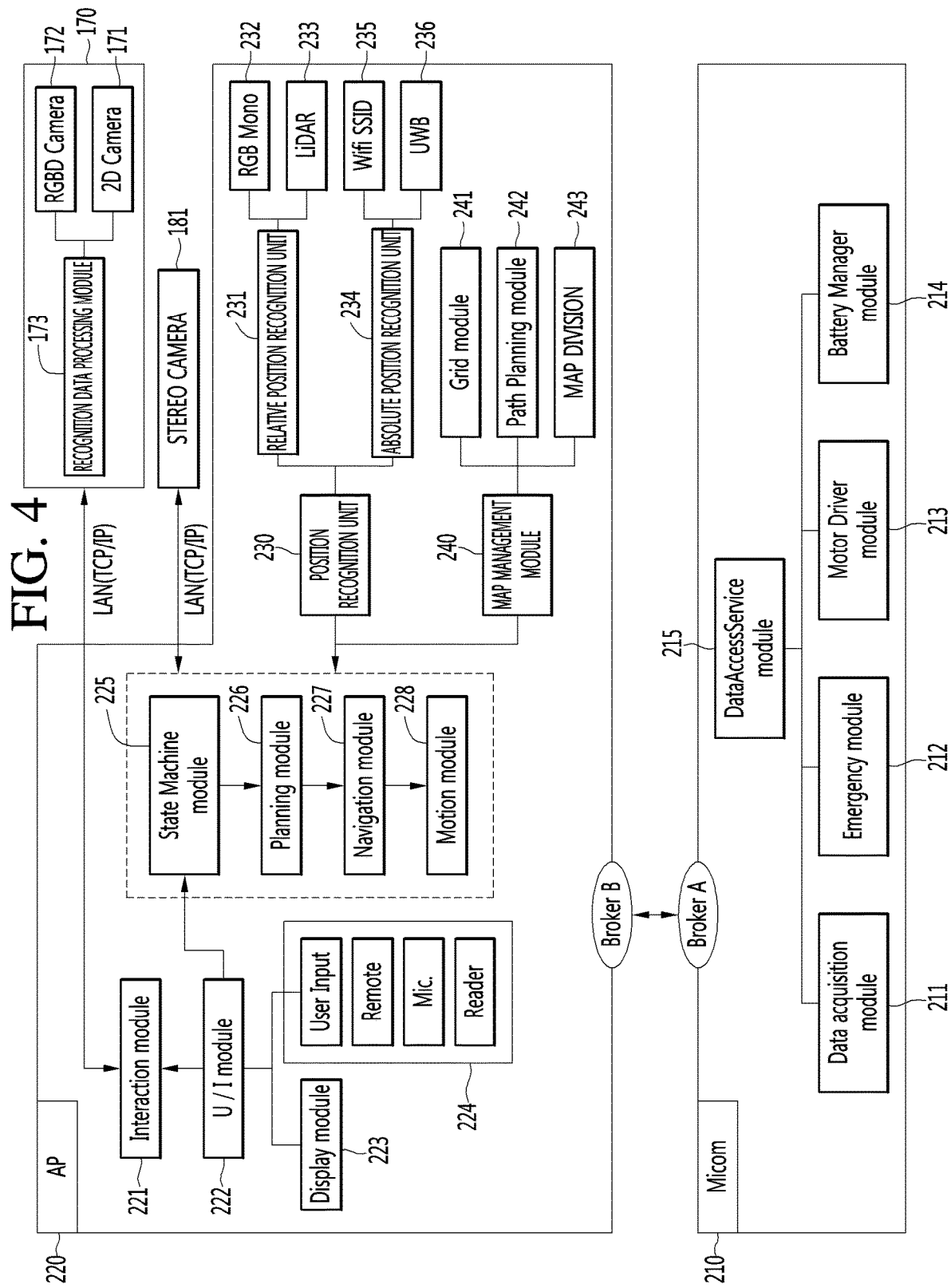
FIG. 4 is a diagram illustrating in detail a configuration of each of a microcomputer and an application processor (AP) of an airport robot according to another embodiment of the present invention.

FIG. 4 is a diagram illustrating in detail a configuration of each of a microcomputer and an AP of an airport robot according to another embodiment of the present invention.

As illustrated in FIG. 4, a microcomputer 210 and an AP (or processor) 220 may be implemented as various embodiments, for controlling recognition and action of the airport.

For example, the microcomputer 210 may include a data access service module 215. The data access service module 215 may include a data acquisition module 211, an emergency module 212, a motor driver module 213, and a battery manager module 214. The data acquisition module 211 may acquire data sensed from a plurality of sensors included in the airport robot and may transfer the acquired data to the data access service module 215. The emergency module 212 may be a module for sensing an abnormal state of the airport robot, and when the airport robot performs a predetermined type action, the emergency module 212 may sense that the airport robot is in the abnormal state. The motor driver module 213 may manage a wheel, a brush, and driving control of a suction motor for driving and cleaning of the airport robot. The battery manager module 214 may manage charging and discharging of the li-ion battery 122 of FIG. 3 and may transfer a battery state of the airport robot to the data access service module 215.

The AP 220 may receive, recognize, and process a user input and the like to control an operation of the airport robot with various cameras and sensors. An interaction module 221 may be a module which synthesizes recognition data received from the recognition data processing module 173 and a user input received from a user interface module 222 to manage software exchanged between a user and the airport robot. The user interface module 222 may receive a close-distance command of the user such as a key, a touch screen, a reader, and a display unit 223 which is a monitor for providing manipulation/information and a current situation of the airport robot, or may receive a long-distance signal such as a signal of an IR remote controller for remotely controlling the airport robot, or may manage a user input received of a user input unit 224 receiving an input signal of the user from a microphone, a barcode reader, or the like. When one or more user inputs are received, the user interface module 222 may transfer user input information to a state machine module 225. The state machine module 225 which has received the user input information may manage a whole state of the airport robot and may issue an appropriate command corresponding to a user input. A planning module 226 may determine a start time and an end time/action for a specific operation of the airport robot according to the command transferred from the state machine module 225 and may calculate a path through which the airport will move. A navigation module 227 may be a module which manages overall driving of the airport robot and may allow the airport robot to drive along a driving path calculated by the planning module 226. A motion module 228 may allow the airport robot to perform a basic operation in addition to driving.

Moreover, the airport robot according to another embodiment of the present invention may include a position recognition unit 230. The position recognition unit 230 may include a relative position recognition unit 231 and an absolute position recognition unit 234. The relative position recognition unit 231 may correct a movement amount of the airport robot through an RGM mono sensor 232, calculate a movement amount of the airport robot for a certain time, and recognize an ambient environment of the airport robot through a LIDAR 233. The absolute position recognition unit 234 may include a WIFI SSID 235 and a UWB 236. The WIFI SSID 235 may be an UWB sensor module for recognizing an absolute position of the airport robot and may be a WIFI module for estimating a current position through WIFI SSID sensing. The WIFI SSID 235 may analyze WIFI signal strength to recognize a position of the airport robot. The UWB 236 may calculate a distance between a transmission unit and a reception unit to sense the absolute position of the airport robot.

Moreover, the airport robot according to another embodiment of the present invention may include a map management module 240. The map management module 240 may include a grid module 241, a path planning module 242, and a map division module 243. The grid module 241 may manage a lattice type map generated by the airport robot through an SLAM camera or map data of an ambient environment, previously input to the airport robot, for position recognition. In map division for cooperation between a plurality of airport robots, the path planning module 242 may calculate driving paths of the airport robots. Also, the path planning module 242 may calculate a driving path through which the airport robot will move. Also, the path planning module 242 may calculate a driving path through which the airport robot will move in an environment where one airport robot operates. The map division module 243 may calculate in real time an area which is to be managed by each of a plurality of airport robots.

Pieces of data sensed and calculated from the position recognition unit 230 and the map management module 240 may be again transferred to the state machine module 225. The state machine module 225 may issue a command to the planning module 226 so as to control an operation of the airport robot, based on the pieces of data sensed and calculated from the position recognition unit 230 and the map management module 240.

Figure 5:
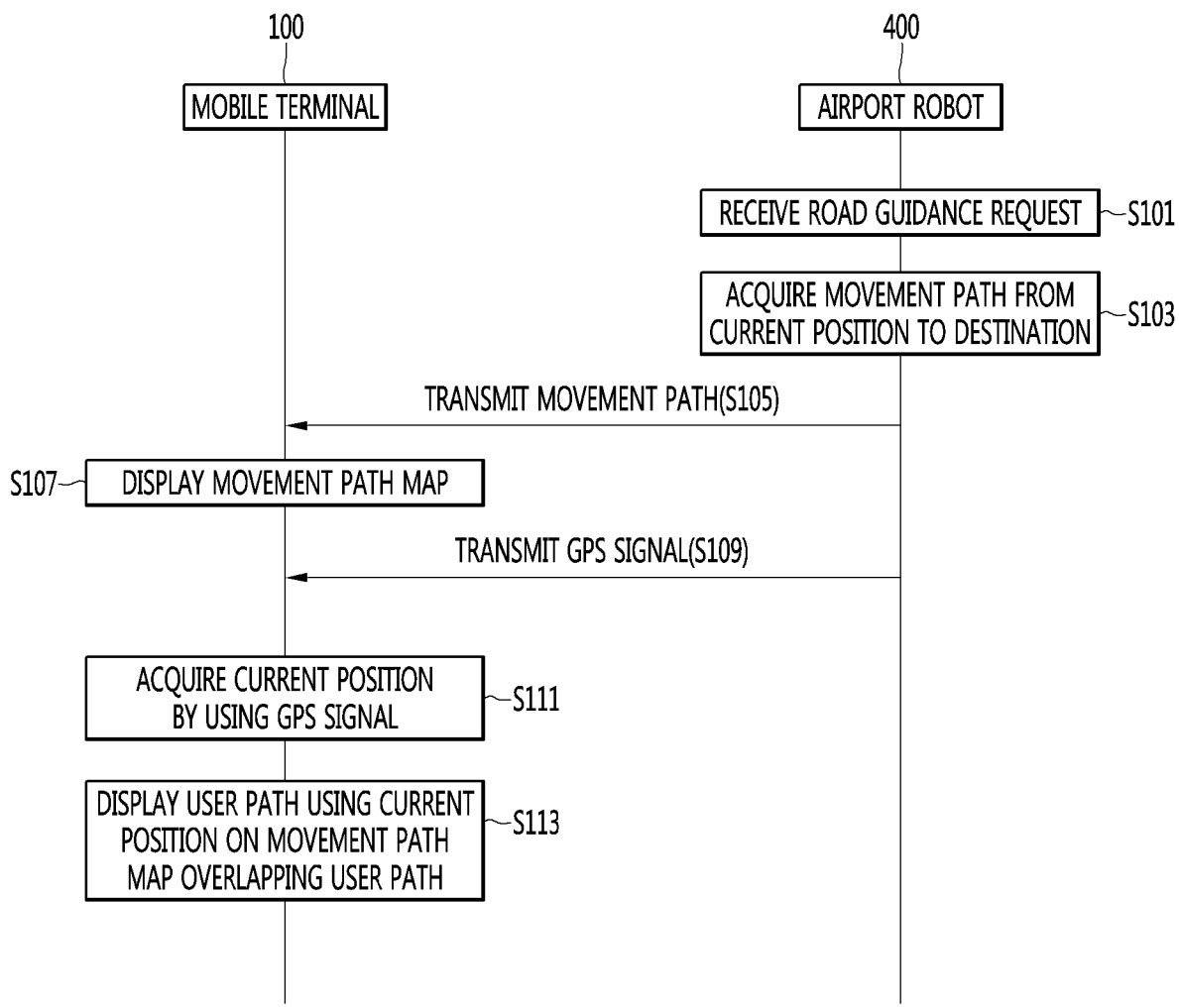
FIG. 5 is a ladder diagram for illustrating an operating method between a mobile terminal and an airport robot according to an embodiment of the present invention.

Next, FIG. 5 is a ladder diagram for illustrating an operating method between a mobile terminal and an airport robot according to an embodiment of the present invention.

An airport robot 400 may receive a road guidance request (S101).

One or more airport robots 400 may be disposed at airport. The airport robot 400 disposed at airport may receive the road guidance request.

In detail, an AP 150 of the airport robot 400 may control a driving driver 140 to move in areas at airport. The driving driver 140 may move the airport robot. The driving driver 140 may control the airport robot 400 to move in predetermined areas.

Users may approach the airport robot 400 which moves in areas at airport and may request road guidance.

Figure 6:
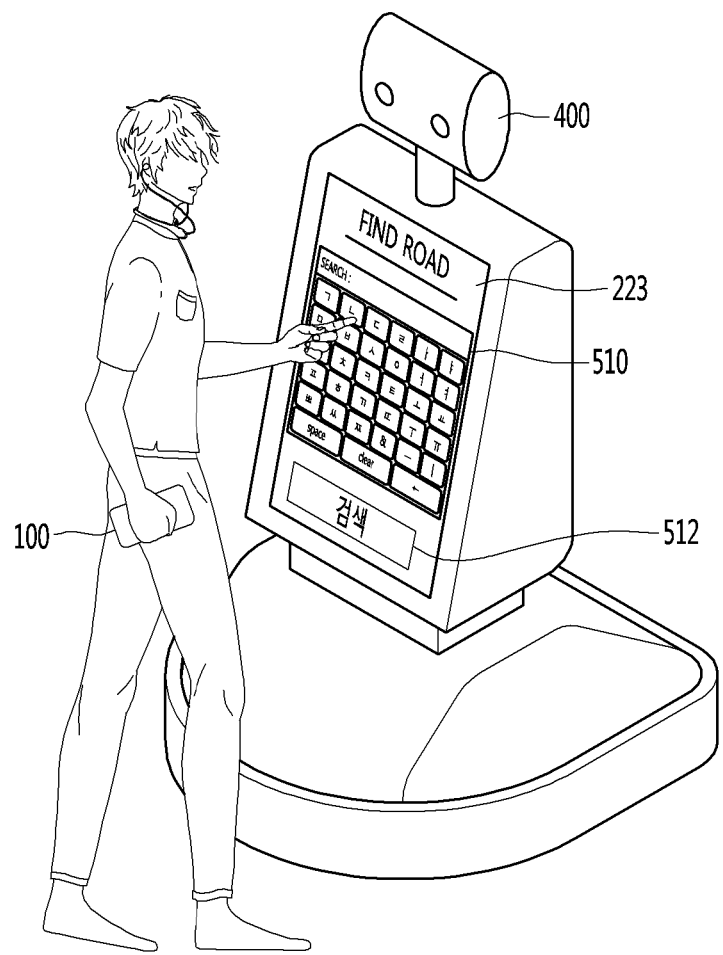
FIG. 6 is a diagram for describing a method of receiving, by an airport robot according to an embodiment of the present invention, a road guidance request.

Next, FIG. 6 is a diagram for describing a method of receiving, by an airport robot according to an embodiment of the present invention, a road guidance request.

As illustrated in FIG. 6, an AP 150 of an airport robot 400 may perform control to display a road finding screen on a display unit 223. The road finding screen may include a destination window 510 and a search icon 512. The destination window 510 may is for receiving a destination input. The destination window 510 may include a plurality of keyboard icons. The AP 150 of the airport robot 400 may receive a command which touches a keyboard icon on the destination window 510. The AP 150 of the airport robot 400 may receive the destination input through the destination window 510 and may receive a command which selects the search icon 512. The AP 150 may execute a movement path search for an input destination according to reception of the command which selects the search icon 512.

The airport robot 400 may receive a road guidance request through the above-described method. A user may approach the airport robot 400 which is driving in areas at airport and may request road guidance by using the above-described method.

FIG. 5 will be described again.

The AP 150 of the airport robot 400 may acquire a movement path from a current position to a destination (S103).

The airport robot 400 may store one or more airport maps.

The AP 150 of the airport robot 400 may recognize a current position. The AP 150 may transmit or receive a signal to or from a server 300 of the airport robot 400, thereby accurately recognizing a current position at airport.

The AP 150 may acquire a movement path from the current position to the destination by using the airport map.

The AP 150 may search for a movement path where a distance from the current position to the destination is shortest. Alternatively, the AP 150 may reflect area-based complexity at airport to search for a movement path where a movement time from the current position to the destination is shortest. Alternatively, the AP 150 may search for a path where a user moves from the current position to the destination via a recommendation place at airport.

The AP 150 may receive a command which selects, as a movement path option, a movement path having a short distance, a movement path having a short movement time, or a movement path passing through a recommendation place. The AP 150 may acquire one of a plurality of rouge paths described above, based on a set option.

The AP 150 of the airport robot 400 may transmit an acquired movement path to a mobile terminal 100 (S105).

Figure 7:
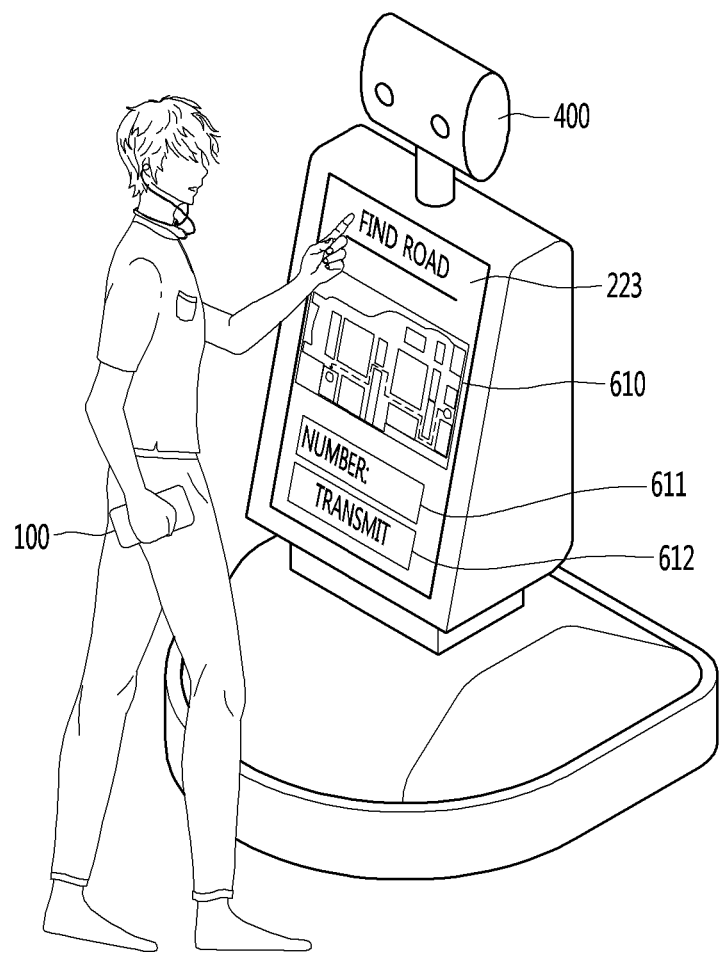
FIG. 7 is a diagram for describing a method of transmitting, by an airport robot according to an embodiment of the present invention, a movement path to a mobile terminal.

Next, FIG. 7 is a diagram for describing a method of transmitting, by an airport robot according to an embodiment of the present invention, a movement path to a mobile terminal.

As illustrated in FIG. 7, an AP 150 may allow a display unit 223 to display a movement path map 610, a number window 611, and a transmission icon 612.

A user may look at the movement path map 610 displayed on the display unit 223 to know a movement path to a destination. Also, the user may transmit the movement path map 610 to a mobile terminal 100 of the user. This is for continuously referring to the movement path map 610 in the middle of moving to the destination.

The number window 611 is a window for transmitting the found movement path map 610 to the mobile terminal 100. The AP 150 may receive a phone number of the mobile terminal 100 through the number window 611. However, this is exemplary, and the AP 150 may display a near field communication (NFC) connection window instead of the number window 611. The AP 150 may perform a communication connection with the mobile terminal close thereto. As an NFC connection is performed, the AP 150 may transmit the movement path map 610 to the mobile terminal 100.

The transmission icon 612 may be an icon for executing transmission of the movement path map 610. The AP 150 may receive a command for selecting the transmission icon 612. The AP 150 may transmit the movement path map 610 to the mobile terminal 100 corresponding to a number input to the number window 611.

The AP 150 may control the LTE router 162 to transmit an acquired movement path to the mobile terminal 100.

The wireless communication unit 110*a* of the mobile terminal 100 may receive a movement path from the airport robot 400. The controller 180*a* of the mobile terminal 100 may acquire a movement path map by using the received movement path.

FIG. 5 will be described again.

The controller 180*a* of the mobile terminal 100 may display a movement path map on the display unit 151*a* (S107).

Figure 8:
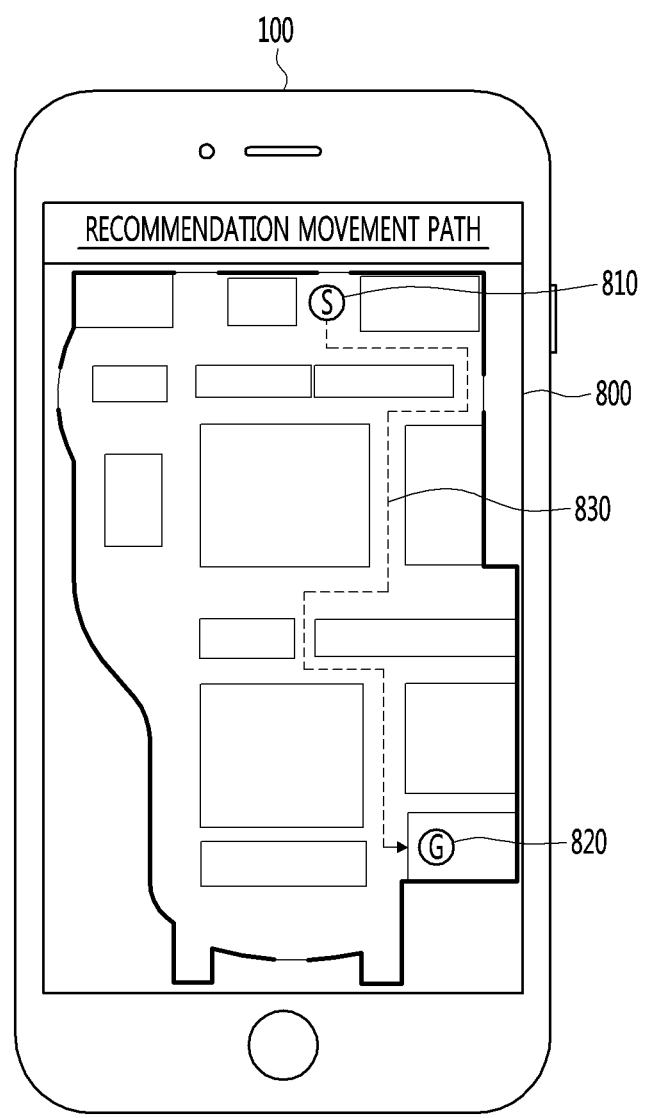
FIG. 8 is a diagram for describing an example where a mobile terminal according to an embodiment of the present invention displays a movement path received from an airport robot.

FIG. 8 is a diagram for describing an example where a mobile terminal according to an embodiment of the present invention displays a movement path received from an airport robot.

As illustrated in FIG. 8, the controller 180*a* of the mobile terminal 100 may display a movement path map 800 on the display unit 151*a*.

The movement path map 800 according to an embodiment of the present invention may include a start point icon 810, a destination icon 820, and a guidance path 830. The start point icon 810 represents a current position recognized by the airport robot 400. The destination icon 810 represents a position of a destination input to the airport robot 400. The guidance path 830 represents a movement path acquired by the airport robot 400.

The movement path map 800 according to an embodiment of the present invention may further display a current movement path of a user. This is for displaying both the guidance path 830 and the current movement path of the user to show whether the user normally moves through the guidance path. To this end, the controller 180*a* of the mobile terminal 100 has to recognize a current position.

The mobile terminal 100 may receive a GPS signal from a GPS satellite to recognize the current position. However, in a case of recognizing the GPS signal from the GPS satellite, since a time difference is large, an error occurrence rate may be large. Therefore, in order to recognize an accurate position at airport, the mobile terminal 100 may recognize the current position through the airport robot 400.

FIG. 5 will be described again.

The AP 150 of the airport robot 400 may perform control to transmit a GPS (or location) signal to the mobile terminal 100 (S109).

The wireless communication unit 110*a* of the mobile terminal 100 may request position recognition from the airport robot 400. The LTE router 162 of the airport robot 400 may receive a position recognition request from the mobile terminal 100. Therefore, the AP 150 of the airport robot 400 may control the LTE router 162 to transmit the GPS signal to the mobile terminal 100.

Each of a plurality of airport robots 400 at airport may transmit the GPS signal to the mobile terminal 100. The wireless communication unit 110*a* of the mobile terminal 100 may receive the GPS signal from each of the plurality of airport robots 400.

The controller 180*a* of the mobile terminal 100 may acquire a current position by using the GPS signal (S111).

Figure 9:
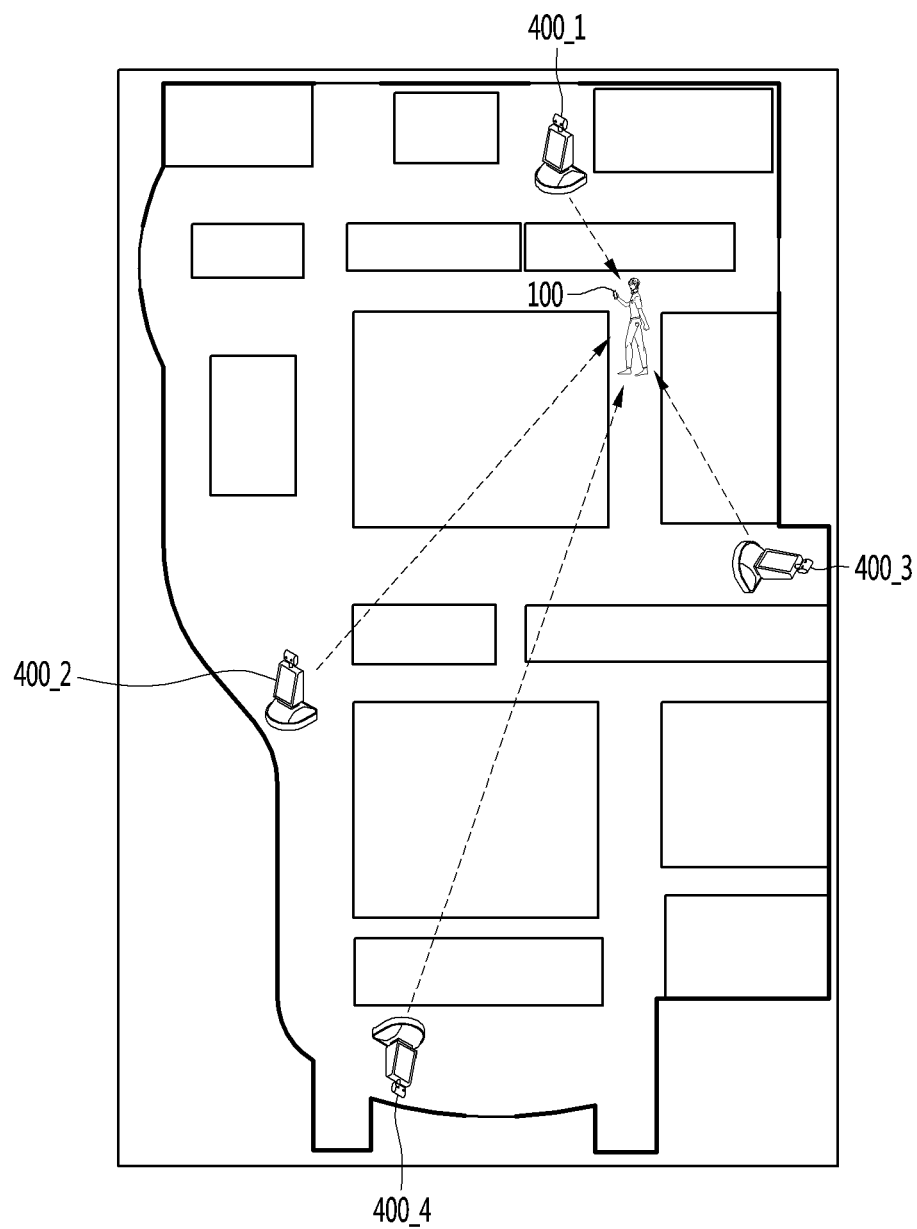
FIGS. 9 and 10 are diagrams for describing a method of obtaining, by a mobile terminal according to an embodiment of the present invention, a current position by using GPS signals received from a plurality of airport robots.
Figure 10:
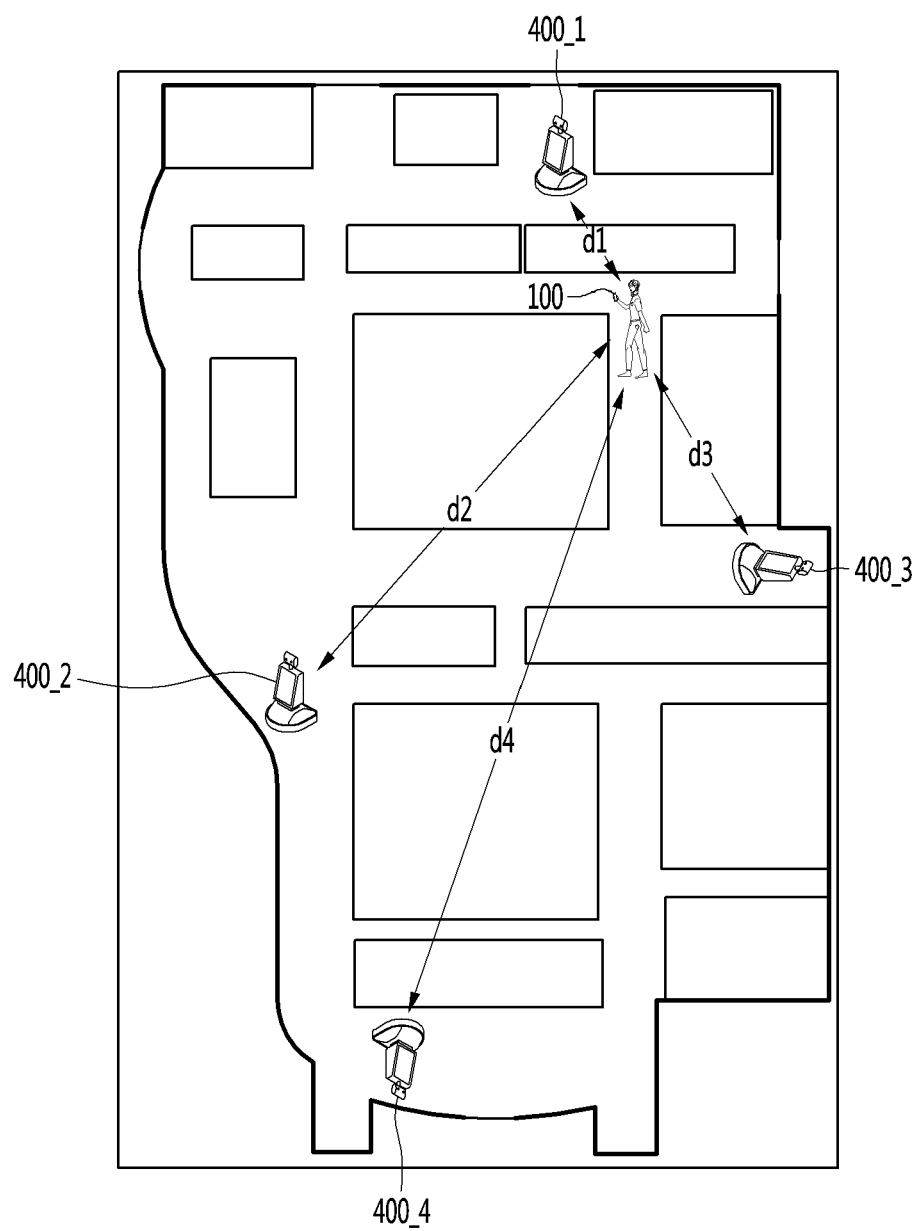

Next, FIGS. 9 and 10 are diagrams for describing a method of obtaining, by a mobile terminal according to an embodiment of the present invention, a current position by using GPS signals received from a plurality of airport robots.

A mobile terminal 100 may acquire a current position by using a triangulation method.

As illustrated in FIG. 9, a plurality of airport robots 400 may be disposed at airport. For example, a first airport robot 400_1, a second airport robot 400_2, a third airport robot 400_3, and a fourth airport robot 400_4 may be at airport.

Each airport robot 400 may move along a set movement path. Therefore, the airport robot 400 may acquire a current position at airport.

The first to fourth airport robots 400_1 to 400_4 may each transmit a GPS signal to the mobile terminal 100. Here, the GPS signal may be a signal which includes a current position of the airport robot 400 and a current time when a signal transmits and may denote a signal which is transmitted from the airport robot 400 to the mobile terminal 100 for accurately determining a current position of the mobile terminal 100 at airport. That is, the GPS signal transmitted from the airport robot 400 to the mobile terminal 100 may represent a signal irrelevant to a GPS satellite signal.

The wireless communication unit 110*a* of the mobile terminal 100 receives a GPS signal the first to fourth airport robots 400_1 to 400_4. The controller 180*a* of the mobile terminal 100 calculates a distance to the airport robot 400 by using the received GPS signal. That is, the controller 180*a* may acquire a time difference between a GPS signal transmitted from the airport robot 400 and a GPS signal received by the mobile terminal 100 and may multiply the time difference by a velocity of the GPS signal to measure a distance to the airport robot 400.

A result obtained by measuring a distance between the mobile terminal 100 and each of the first to fourth airport robots 400_1 to 400_4 through the above-described method may be as illustrated in FIG. 10. That is, a distance between the mobile terminal 100 and the first airport robot 400_1 may be d1, a distance between the mobile terminal 100 and the second airport robot 400_2 may be d2, a distance between the mobile terminal 100 and the third airport robot 400_3 may be d3, and a distance between the mobile terminal 100 and the fourth airport robot 400_4 may be d4.

The controller 180*a* may acquire points where a distance to the first airport robot 400_1 is d1, points where a distance to the second airport robot 400_2 is d2, points where a distance to the third airport robot 400_3 is d3, and points where a distance to the fourth airport robot 400_4 is d4. The controller 180*a* may recognize a cross point as a current position of the mobile terminal 100.

In FIGS. 9 and 10, an example where the mobile terminal 100 receives GPS signals from four airport robots 400 has been described above, but the mobile terminal 100 may receive GPS signals from three or more airport robots 400 to recognize a current position thereof.

The controller 180*a* may accurately recognize the current position of the mobile terminal 100 through the above-described method.

FIG. 5 will be described again.

The controller 180*a* of the mobile terminal 100 may display a movement path map and a movement path which overlaps the movement path map by using a current position (S113).

The controller 180*a* of the mobile terminal 100 may acquire the movement path by using the current position. The controller 180*a* may display the movement path map and the movement path overlapping the movement path map.

Figure 11A:
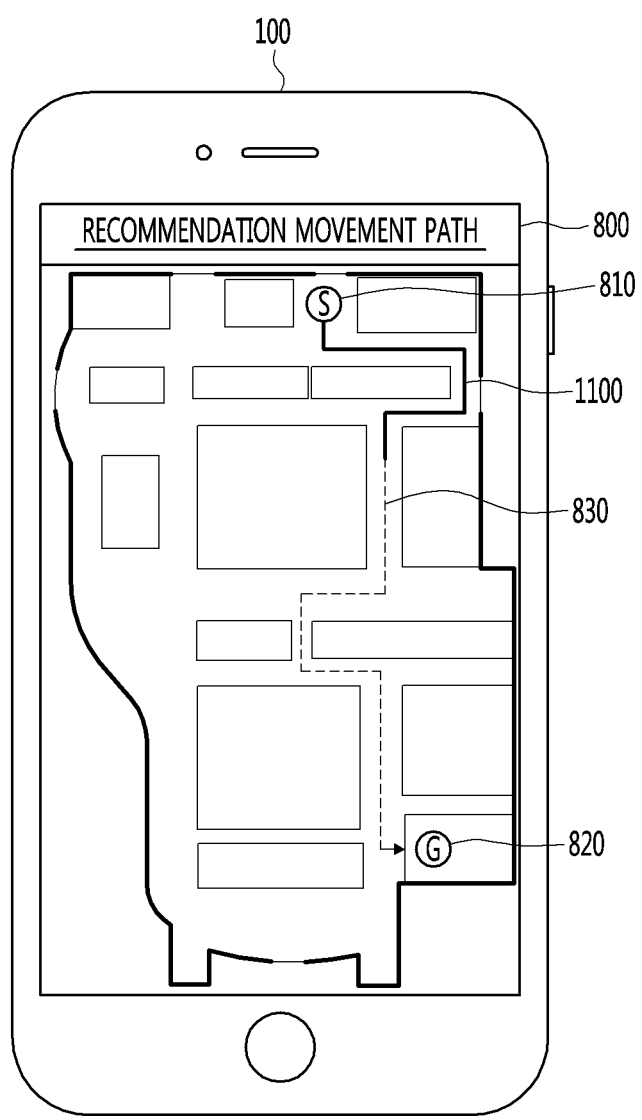
FIGS. 11A and 11B are diagrams for describing a method of displaying a movement path and a guidance path according to a first embodiment of the present invention.
Figure 11B:
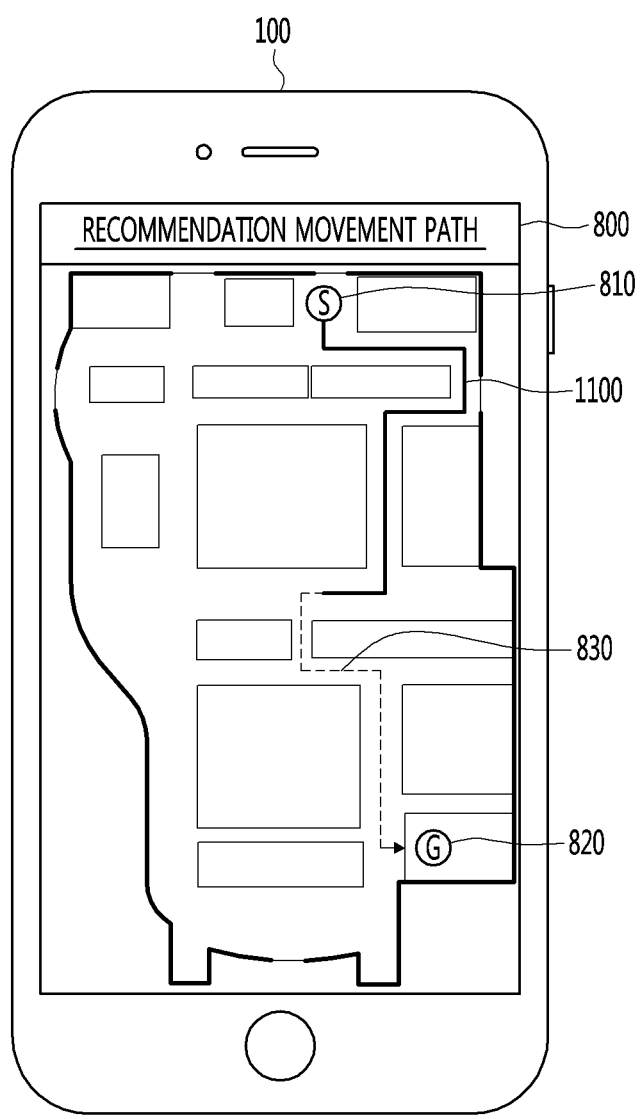

Next, FIGS. 11A and 11B are diagrams for describing a method of displaying a movement path and a guidance path according to a first embodiment of the present invention.

The controller 180*a* of the mobile terminal 100, as illustrated in FIG. 11A, may display a movement path map 800 on the display unit 151*a*.

The movement path map 800 may include a start point icon 810, a destination icon 820, a guidance path 830, and a user path 1100.

The start point icon 810, the destination icon 820, and the guidance path 830 are as described above with reference to FIG. 8.

The user path 1100 represents a path through which the mobile terminal 100 moves. The controller 180*a* of the mobile terminal 100 recognizes a current position at every predetermined period. The period may be one second or less. When the period is one second or less, a current position may be accurately recognized.

The controller 180*a* may acquire, by using the recognized current position, the user path 1100 through which the mobile terminal 100 moves.

The controller 180*a* may allow the display unit 151*a* to display the guidance path 830 and the user path 1100 which overlap each other. Therefore, as illustrated in FIG. 11A, the controller 180*a* may display the user path 1100. As the current position is changed, the controller 180*a* may change and display the user path 1100 as illustrated in FIG. 11B.

The user may check whether the user is normally moving to a destination, based on the movement path map 800 illustrated in FIGS. 11A and 11B.

Figure 12A:
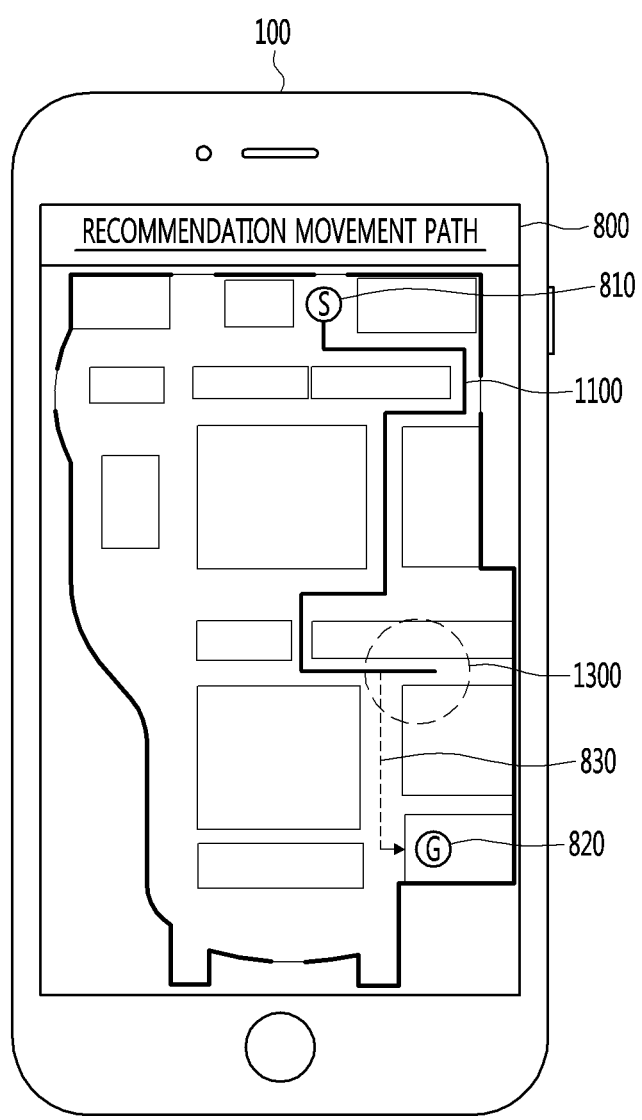
FIGS. 12A to 12C are diagrams for describing a method of displaying a movement path and a guidance path according to a second embodiment of the present invention.
Figure 12B:
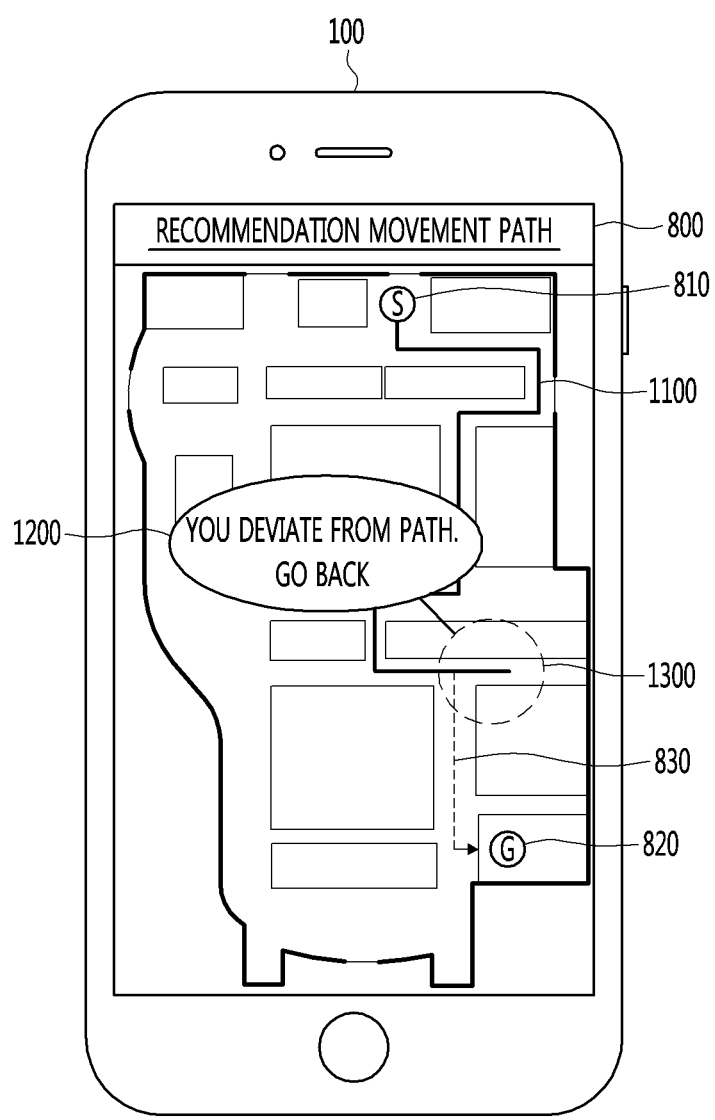
Figure 12C:
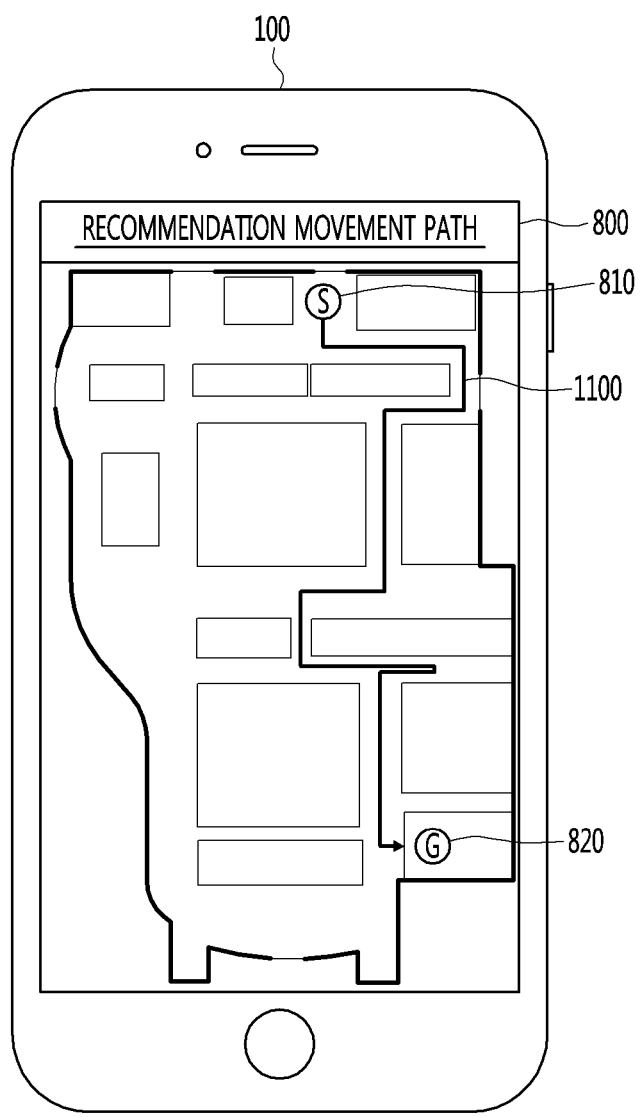

Next, FIGS. 12A to 12C are diagrams for describing a method of displaying a movement path and a guidance path according to a second embodiment of the present invention.

As illustrated in FIG. 12A, the controller 180*a* of the mobile terminal 100 may display the guidance path 830 and the user path 1100 on the movement path map 800. At this time, the controller 180*a* may sense that the user path 1100 differs from the guidance path 830. That is, the controller 180*a* may sense that the user path 1100 differs from the guidance path 830 by a predetermined criterion or more. For example, the controller 180*a* may sense that the user path 1100 differs from the guidance path 830 as in a first region 1300 illustrated in FIG. 12A.

In this case, the controller 180*a* may allow the display unit to display a guidance message 1200 illustrated in FIG. 12B. For example, the guidance message 1200 may include road guidance information such as the deviation or not of a path such as 'You deviate from a path. Go back.'. However, this is merely an embodiment, and thus, the present invention is not limited thereto.

A user may look at the movement path map 800 illustrated in FIG. 12B and may check that the user path 1100 deviates from the guidance path 830. Also, the user may check the guidance message 1200 illustrated in FIG. 12B. Therefore, the user may stop and may search for a guidance path.

The display unit 151a of the mobile terminal 100, as illustrated in FIG. 12C, may display the user path 1100 up to the destination icon 820.

Next, FIGS. 13A to 13D are diagrams for describing a method of displaying a movement path and a guidance path according to a third embodiment of the present invention.

Figure 13A:
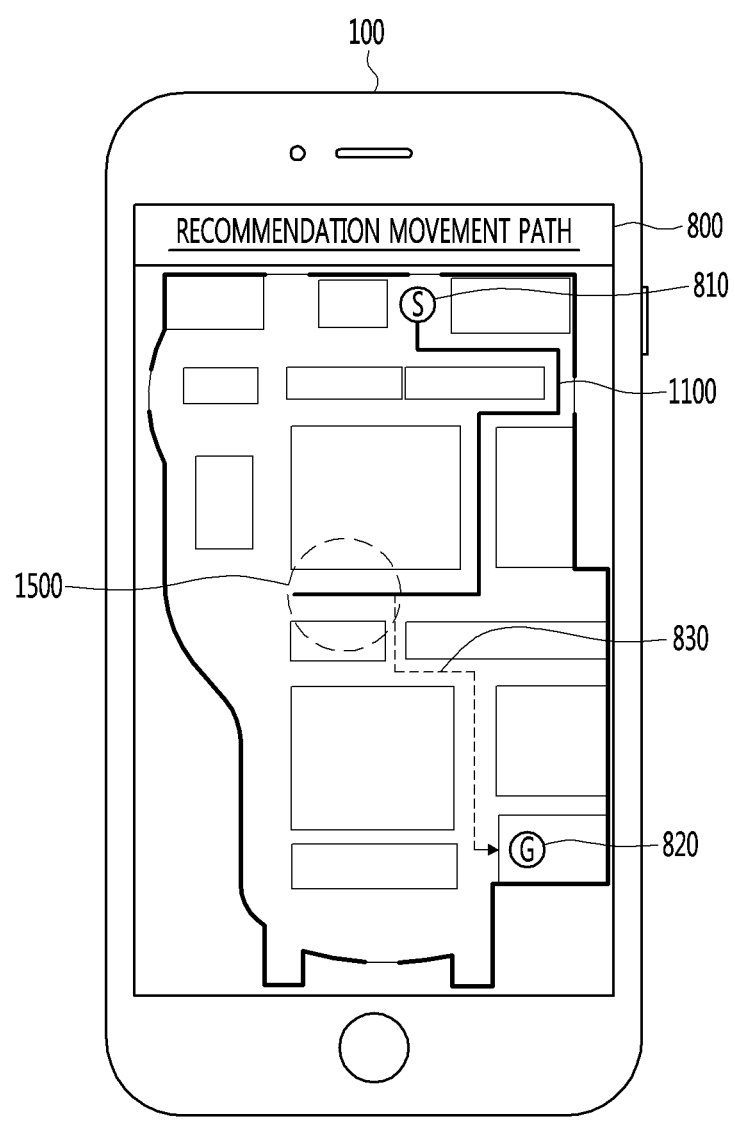
FIGS. 13A to 13D are diagrams for describing a method of displaying a movement path and a guidance path according to a third embodiment of the present invention.

As illustrated in FIG. 13A, the controller 180a of the mobile terminal 100 may display the guidance path 830 and the user path 1100 on the movement path map 800. At this time, the controller 180a may sense that the user path 1100 differs from the guidance path 830. That is, the controller 180a may sense that the user path 1100 differs from the guidance path 830 by a predetermined criterion or more. For example, the controller 180a may sense that the user path 1100 differs from the guidance path 830 as in a second region 1500 illustrated in FIG. 13A.

The controller 180a may determine whether there is another path from a current position to a destination 820. In detail, the controller 180a may transmit, to the airport robot 400, a movement path request signal which requests the other path from the current position to the destination. The AP 150 of the airport robot 400 may determine whether there is another path from a current position of the mobile terminal 100 to a destination. When it is determined that there is no other path, the AP 150 may transmit, to the mobile terminal 100, a display command of the guidance message 1200 illustrated in FIG. 12B. When it is determined that there is the other path, the AP 150 may transmit another movement path to the mobile terminal 100.

When the wireless communication unit 110a of the mobile terminal 100 receives the display command of the guidance message 1200, the controller 180a may display a screen illustrated in FIG. 12B. When the wireless communication unit 110a receives another guidance path, the controller 180a may display a recommendation message 1600 illustrated in FIG. 13B.

Figure 13B:
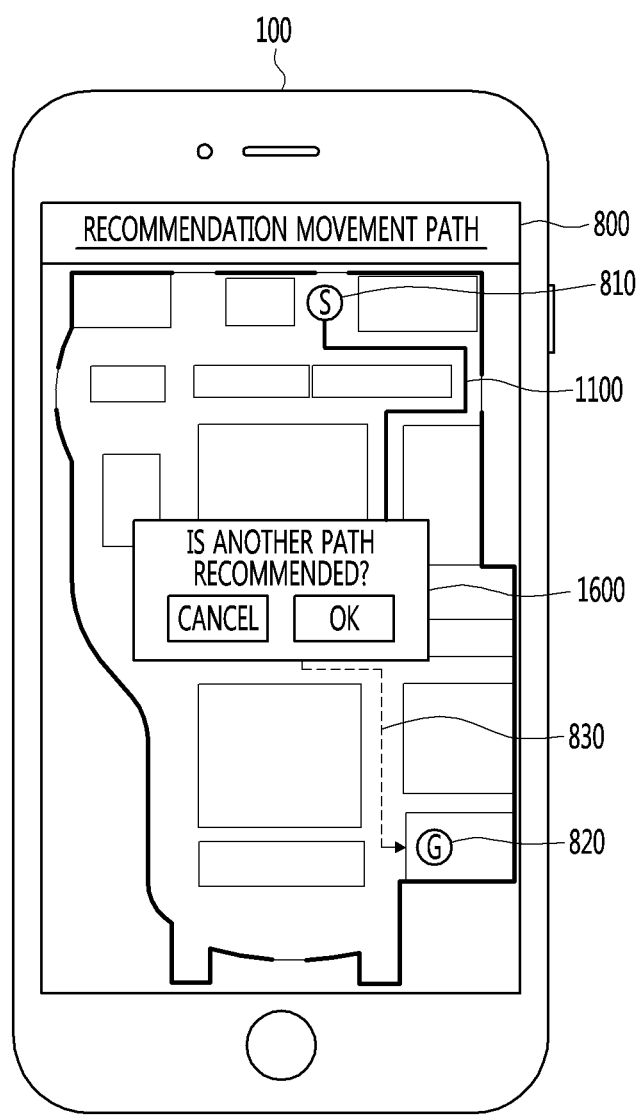

The recommendation message 1600 may be a message for checking another path display as illustrated in FIG. 13B. When the controller 180a receives a command for selecting a cancel icon on the recommendation message 1600, the controller 180a may allow the display unit to display the previously received guidance path 830. For example, when the controller 180a receives a command for selecting a check icon on the recommendation message 1600, the controller 180a may allow the display unit to display another guidance path 1700 as illustrated in FIG. 13C.

Figure 13C:
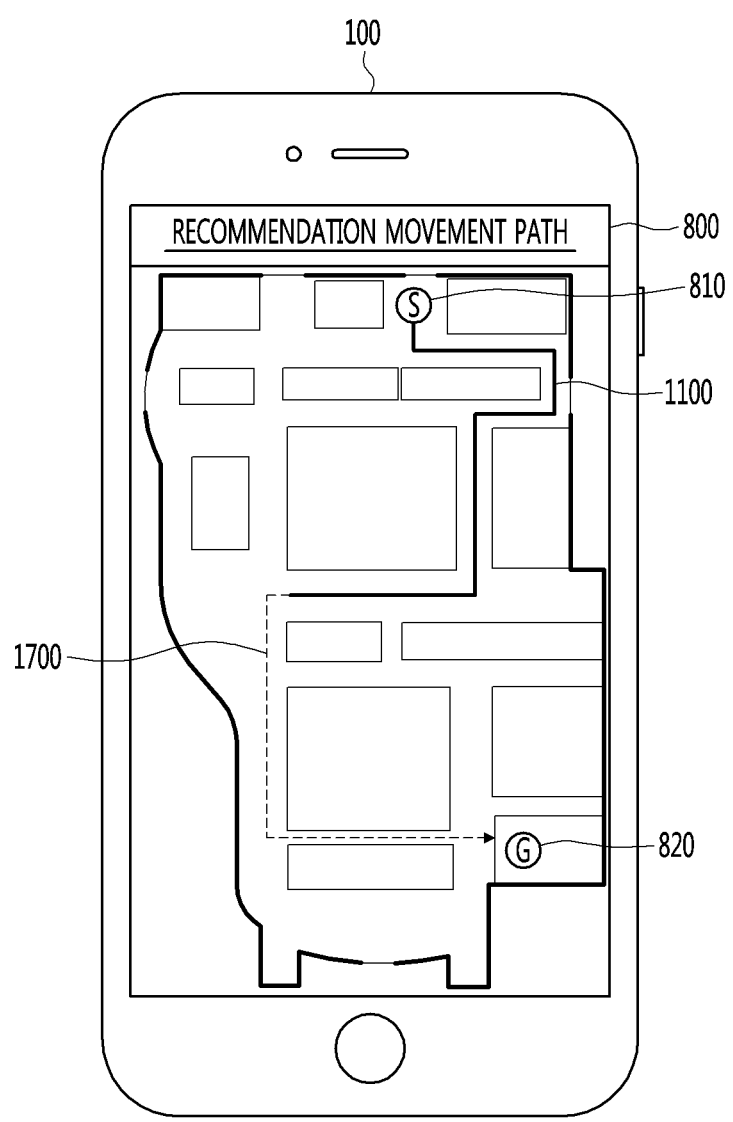
Figure 13D:
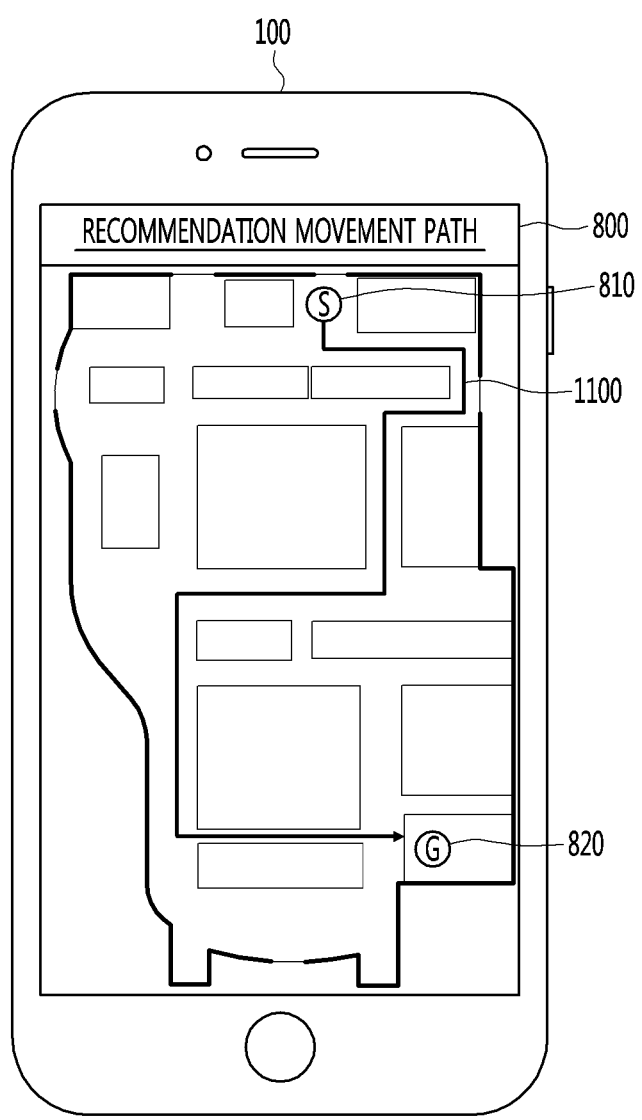

The user may find its destination without going back to its passed way, based on the other guidance path 1700 illustrated in FIG. 13C. Therefore, the display unit 151a of the mobile terminal 100 may display a user path 1100 illustrated in FIG. 13D.

Next, FIGS. 14A to 14D are diagrams for describing a method of displaying a movement path and a guidance path according to a fourth embodiment of the present invention.

Figure 14A:
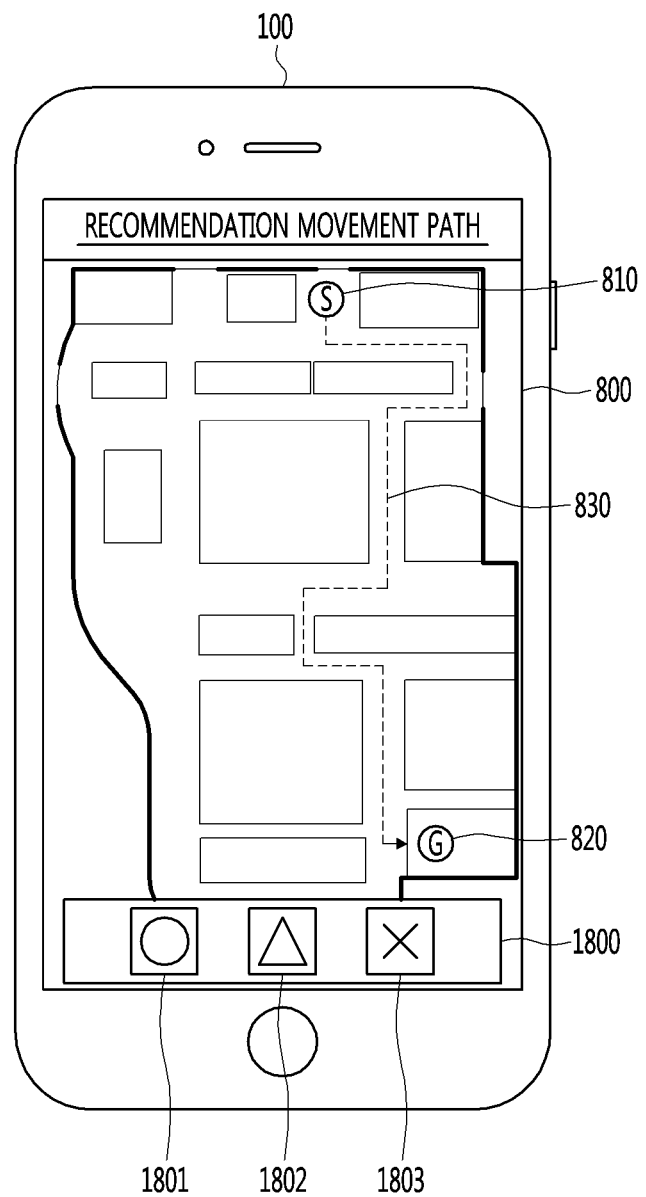
Figure 14B:
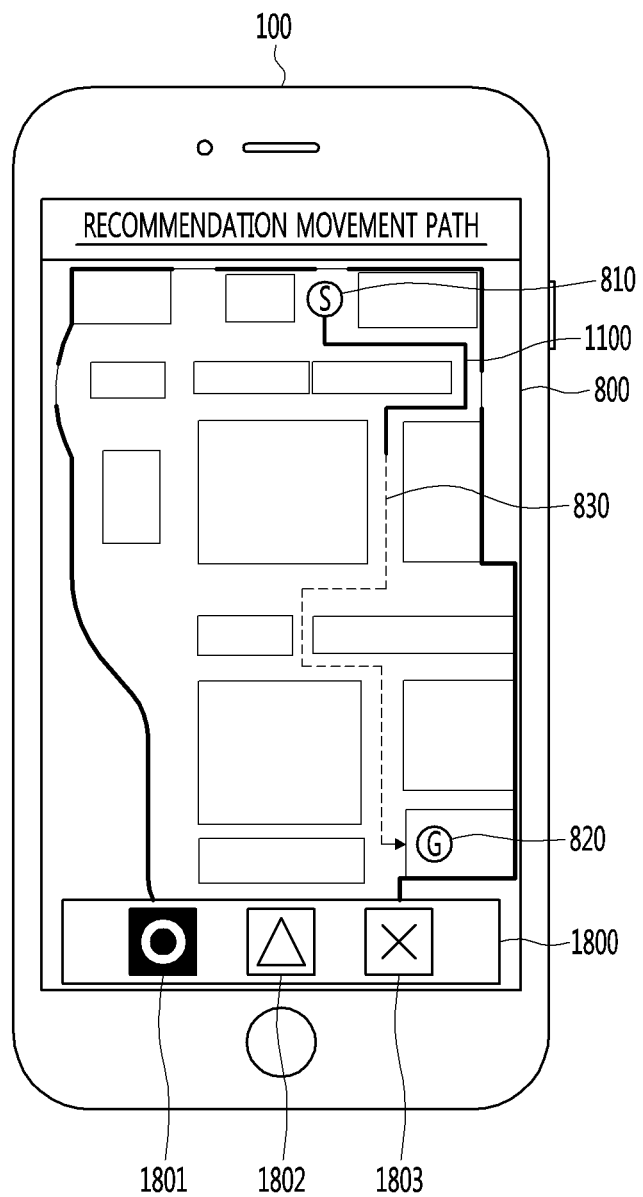

The controller 180a of the mobile terminal 100, as illustrated in FIG. 14A, may allow the display unit to display a path guidance bar 1800 on a movement path map 800.

The path guidance bar 1800 shows a possibility of reaching a destination of the mobile terminal 100. The path guidance bar 1800 may include a first icon 1801, a second icon 1802, and a third icon 1803.

The first icon 1801 is an icon representing that a current position of the mobile terminal 100 is included in a guidance path 830. For example, the controller 180a may determine whether a user path 1100 matches the guidance path 830.

When it is determined that the user path 1100 matches the guidance path 830, the controller 180a may allow the display unit to display the first icon 1801 to be emphasized. That is, the controller 180a may allow the display unit to display the first icon 1801 to be distinguished from the second icon 1802 and the third icon 1803.

Each of the second icon 1802 and the third icon 1803 is an icon representing that the current position of the mobile terminal 100 is not included in a guidance path 830. Particularly, the second icon 1802 is an icon representing that the user path 1100 does not match the guidance path 830, but there is another path. The third icon 1803 is an icon representing that the user path 1100 does not match the guidance path 830 and there is no other path.

For example, as in a second region 1500 illustrated in FIG. 14C, the controller 180a may sense that the user path 1100 differs from the guidance path 830. Also, the controller 180a may recognize that there is another guidance path up to a destination, in addition to the guidance path 830. In this case, the controller 180a may allow the display unit to display the second icon 1802 to be emphasized. That is, the controller 180a may allow the display unit to display the second icon 1802 to be distinguished from the first icon 1801 and the third icon 1803.

Figure 14D:
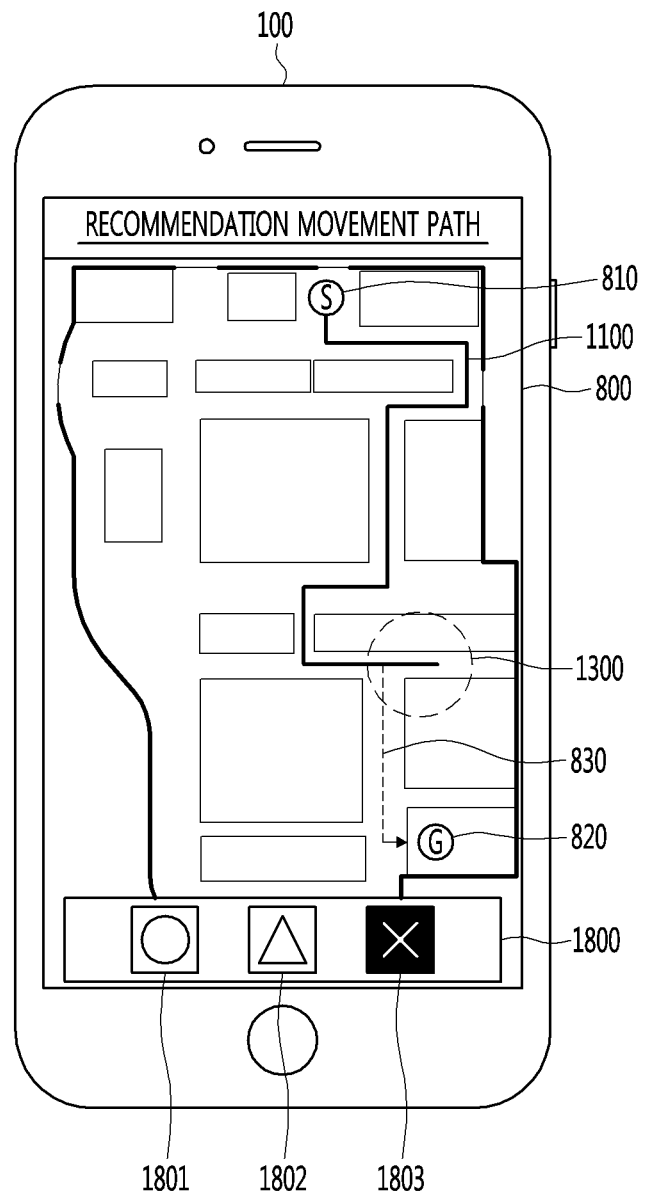

Referring to FIG. 14D, as in a first region 1300, the controller 180a may sense that the user path 1100 differs from the guidance path 830. Also, the controller 180a may recognize that there is no other guidance path up to a destination, in addition to the guidance path 830. In this case, the controller 180a may allow the display unit to display the third icon 1803 to be emphasized. That is, the controller 180a may allow the display unit to display the third icon 1803 to be distinguished from the first icon 1801 and the second icon 1802.

In FIGS. 14A to 14D, the first to third icons 1801 to 1803 of the path guidance bar 1800 are respectively illustrated in a circular shape, a triangular shape, and an X-shape, but this is merely an embodiment. For example, the first to third icons 1801 to 1803 may be icons respectively configured in green, yellow, and red. As described above, the path guidance bar 1800 according to an embodiment of the present invention may be configured with a plurality of icons capable of being distinguished from one another.

According to an embodiment of the present invention, the above-mentioned method can be embodied as computer readable codes on a non-transitory computer readable recording medium having a program thereon. Examples of the computer readable recording medium include ROM, RAM, CD-ROM, magnetic tape, floppy disk, and an optical data storage device. Also, the computer can include an AP 150 of the robot for airport. The above-described display device is not limited to the application of the configurations and methods of the above-described embodiments and the entire or part of the embodiments can be selectively combined and configured to allow various modifications.

The invention claimed is:

1. A system comprising:
   a robot configured to receive in input identifying a destination, and determine a movement path from a starting position to the destination; and
   a mobile terminal configured to receive information associated with the movement path from the robot, and display a map based on the movement path,
   wherein the map includes a guidance path representing the movement path and a user path representing a movement of the mobile terminal along the guidance path, wherein the mobile terminal further configured to:
receive a location signal from each of a plurality of robots, each of the location signals includes information identifying a current position of one of the robots that transmitted the location signal when the location signal is transmitted and time information about a time when the location signal is transmitted,
identify respective times when the location signals are received,
determine respective time differences between the times when the locations signals are transmitted and the times when the location signals are received,
calculate distances to the robots based multiplying the time differences and a velocity of the location signals, and
recognize a current position of the mobile terminal based on the current positions of the robots and the distances to the robots.

2. The system of claim 1, wherein the mobile terminal periodically receives a location signal from the robot, identifies a position of the mobile terminal based on the location signal, and determines the movement of the mobile terminal based on the position.

3. The system of claim 2, wherein the mobile terminal receives location signals from three or more robots, and identifies the position of the mobile terminal based on the location signals.

4. The system of claim 1, wherein the robot transmits the information associated with the movement path to the mobile terminal through a near field communication (NFC) connection with the mobile terminal.

5. A mobile terminal comprising:
a wireless communication interface configured to receive information related to a movement path from a robot;
a display configured to present a map based on of the movement path; and
a controller configured to manage the display to present, on the map, a guidance path representing the movement path and a user path representing a movement of the mobile terminal along the guidance path,
wherein the wireless communication interface receives a location signal from each of a plurality of robots, each of the location signals includes information identifying a current position of one of the robots that transmitted the location signal when the location signal is transmitted and time information about a time when the location signal is transmitted, and
wherein the controller is further configured to:
identify respective times when the location signals are received,
determine respective time differences between the times when the locations signals are transmitted and the times when the location signals are received,
calculate distances to the robots based multiplying the time differences and a velocity of the location signals, and
recognize a current position of the mobile terminal based on the current positions of the robots and the distances to the robots.

6. The mobile terminal of claim 5, wherein:
the controller further determines whether the guidance path differs from the user path by a prescribed distance or more, and
when the guidance path differs from the user path by the prescribed distance or more, the controller further manages the display to present a path deviation guidance message indicating that the mobile device is deviating from the guidance path.

7. The mobile terminal of claim 6, wherein, when the guidance path differs from the user path by the prescribed distance or more, the controller further manages the display to present another guidance path.

8. The mobile terminal of claim 7, wherein the other guidance path corresponds to another movement path received from the robot.

9. The mobile terminal of claim 7, wherein the other guidance path corresponds to a movement path between a position, at which the guidance path differs from the user path, to a destination.

10. An operating method of a mobile terminal, the operating method comprising:
receiving information associated with a movement path from a robot;
identifying a current position of the mobile terminal;
determining a movement of the mobile terminal based on the current position of the mobile terminal; and
displaying a guidance path representing the movement path and a user path representing the movement of the mobile terminal and overlapping the guidance path,
wherein the operating method further comprises:
receiving a location signal from each of a plurality of robots, each of the location signals includes information identifying a current position of one of the robots that transmitted the location signal when the location signal is transmitted and time information about a time when the location signal is transmitted, and
wherein identifying the current position of the mobile terminal comprises:
identifying respective times when the location signals are received;
determining respective time differences between the times when the locations signals are transmitted and the times when the location signals are received;
calculating distances to the robots based multiplying the time differences and a velocity of the location signals; and
recognizing the current position of the mobile terminal based on the current positions of the robots and the distances to the robots.

11. The operating method of claim 10, further comprising:
receiving a location signal from each of a plurality of robots;
recognizing the current position of the mobile terminal using the location signals; and
determining whether the guidance path matches the user path, based on the current position.

12. The operating method of claim 11, further comprising:
receiving information identifying another path to a destination from the robot; and
displaying a path guidance bar, wherein the path guidance bar includes one or more of:
a first icon indicating that the guidance path matches the user path;
a second icon indicating that the guidance path does not match the user path and there is another path to the destination; or
a third icon indicating that the guidance path does not match the user path and there is no other path to the destination.

* * * * *